(12) United States Patent
Sasaki et al.

(10) Patent No.: US 9,336,254 B2
(45) Date of Patent: May 10, 2016

(54) DATABASE PERFORMANCE ESTIMATION DEVICE AND DATABASE ESTIMATION METHOD

(75) Inventors: Shigero Sasaki, Tokyo (JP); Yoshihiro Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 145 days.

(21) Appl. No.: 14/124,209

(22) PCT Filed: Apr. 10, 2012

(86) PCT No.: PCT/JP2012/002489
§ 371 (c)(1),
(2), (4) Date: Dec. 5, 2013

(87) PCT Pub. No.: WO2012/169102
PCT Pub. Date: Dec. 13, 2012

(65) Prior Publication Data
US 2014/0114951 A1    Apr. 24, 2014

(30) Foreign Application Priority Data

Jun. 8, 2011  (JP) ................................. 2011-127930

(51) Int. Cl.
*G06F 7/00* (2006.01)
*G06F 17/00* (2006.01)
(Continued)

(52) U.S. Cl.
CPC ...... *G06F 17/30327* (2013.01); *G06F 11/3419* (2013.01); *G06F 11/3452* (2013.01); *G06F 2201/80* (2013.01)

(58) Field of Classification Search
None
See application file for complete search history.

(56) References Cited

U.S. PATENT DOCUMENTS 5,758,146 A  5/1998  Schiefer et al.
5,778,353 A  7/1998  Schiefer et al.
5,875,445 A * 2/1999  Antonshenkov
(Continued)

FOREIGN PATENT DOCUMENTS

CA  2124094  11/1995
JP  63-220323  9/1988
(Continued)

OTHER PUBLICATIONS

International Search Report corresponding to PCT/JP2012/002489, dated Jun. 5, 2012, 2 pages.
(Continued)

*Primary Examiner* — Susan Chen
(74) *Attorney, Agent, or Firm* — Wilmer Cutler Pickering Hale and Dorr LLP

(57) ABSTRACT

A database performance estimation device includes: a unit that switches at least two types of calculation methods according to configuration mode data and performs the switched calculation method to acquire a child block searching time (d) and a leaf block scanning time (s); a unit that switches at least two types of calculation methods according to the configuration mode data and performs the switched calculation method to acquire an entry inserting time (i); and a unit that calculates an average time required for identifying a target leaf block per one manipulation performed to the index block, an average time required for searching for a target entry in the identified leaf block, and an average time required for inserting a target entry in the identified leaf block, and estimates the total of the average times calculated above as an average processing time per one manipulation performed to the index block.

11 Claims, 11 Drawing Sheets

(51) Int. Cl.
*G06F 17/30* (2006.01)
*G06F 11/34* (2006.01)

(56) References Cited

U.S. PATENT DOCUMENTS

2006/0265489 A1* 11/2006 Moore .......................... 709/223
2008/0005086 A1* 1/2008 Moore ............................. 707/3
2008/0222090 A1 9/2008 Sasaki
2012/0311581 A1* 12/2012 Balmin et al. ................ 718/100

FOREIGN PATENT DOCUMENTS

| JP | 02-054347 | 2/1990 |
| JP | 03-002938 | 1/1991 |
| JP | 08-030639 | 2/1996 |
| JP | 2008-225575 | 9/2008 |

OTHER PUBLICATIONS

Comer, D., "Ubiquitous B-Tree", ACM Computing Surveys, Jun. 1979, vol. 11, No. 2, p. 121-137.

"Oracle Database Concepts", 10g Release 2, parts No. B19215-02, Mar. 2006 (FIGs. 5-7), retrieved from <http://otndnld.oracle.co.jp/document/products/oracle10g/102/doc_cd/server.102/B19215-02.pdf>, 552 pages.

Drepper, U. "What Every Programmer Should Know about Memory", Red Hat Inc., Nov. 21, 2007, retrieved from <http://people.redhat.com/drepper/cpumemory.pdf>, 114 pages.

Mohan, C. "Implications of Storage Class Memories (SCM) on Software Achitectures", 13th International Workshop on High Performance Transaction Systems (HPTS), Oct. 2009, retrieved from <http://hpts.ws/session2/mohan.pdf>, 25 pages.

Gray, J. et al., "The 5 Minute Rule for Trading Memory for Disc Accesses and the 10 Byte Rule for Trading for CPU Time", Proceedings of SIGMOD 87, 1987, 4 pages.

Gray, J. et al., "The Five-Minute Rule Ten Years Later, and Other Computer Storage Rules of Thumb", SIGMOD Record 26, Dec. 4, 1997, 6 pages.

Graefe, G., "The Five-Minute Rule Twenty Years Later, and How Flash Memory Changes the Rules", PRoceedings of the Third International Workshop on Data Management on New Hardware, Jun. 2007, 9 pages.

Oda, K., "Mongai fushutsu no Oracle genba waza", Chapter 4, Study on Optimizer, which is a brain for Oracle Database, retrieved from <http://www.oracle.com/technology/global/jp/pub/jp/db_magazine/mongai/chapter4_2.html#part2>, 2 pages.

Lightstone, S. et al., "Physical Database Design: the database professional's guide to exploiting indexes, views, storage, and more (The Morgan Kauffman Series in Data Management Systems)", Morgan Jauffman; 4th Revised edition, 2007, 3 pages.

* cited by examiner

FIG. 11

|  | LATENCY (usec) | BANDWIDTH (MB/s) | PRICE ($/GB) |
|---|---|---|---|
| CACHE (L2) | 0.005 | N/A | N/A |
| MEMORY (DIMM DDR3) | 0.08~0.2 | 10,000 | 75~80 |
| FLASH (SSD MLC) | 25 | 100 | 8~12 |
| DISK (SATA) | 13,000 | 105 | 0.3~0.5 |

DATABASE PERFORMANCE ESTIMATION DEVICE AND DATABASE ESTIMATION METHOD

CROSS-REFERENCE TO RELATED APPLICATIONS

This application is a national stage application of International Application No. PCT/JP2012/002489 entitled "Database Performance Estimation Device and Database Estimation Method," filed on Apr. 10, 2012, which claims the benefit of the priority of Japanese patent application No. 2011-127930 filed on Jul. 8, 2011, the disclosures of each of which are hereby incorporated by reference in their entirety.

TECHNICAL FIELD

The present invention relates to a technique of estimating performance of a database having an index block applied thereto.

BACKGROUND ART

As a tree-type index, a B-tree index has been widely used. Non-patent Document 1 below describes searching by using a B-tree, and an algorithm for inserting data into the B-tree and deleting data from the B-tree. Further, Non-patent Document 2 below describes the B-tree for a widely used relational database in ORACLE (registered trademark).

FIG. 10 illustrates a configuration example of the B-tree index based on FIG. 5 to FIG. 7 of Non-patent Document 2 below. In ORACLE (registered trademark), storage areas are managed using a certain unit (for example, 8 KB), and this unit is called a block. The block includes three types: a data block, a leaf block, and a branch block. The data block stores data rows as a whole. Indexes are stored in the leaf block and the branch block. Thus, the leaf block and the branch block are also called index blocks. The leaf block is a block at the lowest level of the index block. The branch block is a block having a link to the leaf block or another branch block.

At least one entry, which serves as the index, is stored in the leaf block and the branch block. In particular, the branch block in the highest level is also called a root block. Each entry contains a value of a column (hereinafter, referred to as a key) serving as a target of searching, and an identifier (ID). The identifier is data for identifying data row or other block. The identifier contained in the entry of the leaf block is used for identifying any one of data rows in the data block, and the identifier contained in the entry of the branch block is used for identifying any one of other branch blocks or any one of the leaf blocks. Thus, in order to identify a leaf block having a key satisfying a searching condition, a searcher sequentially compares keys in the branch block with data on the searching condition, and traces the branch block using the identifier.

The B-tree is designed by implicitly taking it into consideration that duplicating blocks from a slow hard disk to fast memory results in a bottleneck. Non-patent Document 1 below describes in the section "Balancing" that reading blocks involves disk access, and hence, it is important to maintain a low height for the B-tree. Actually, in a state where many blocks are stored on the hard disk and only a part of the blocks is cached in the memory, most of the blocks are read from the disk.

In this case, the disk accesses result in a bottleneck in the performance. This is because the latency of the access to the data on the memory and the data transfer rate (bandwidth) of the data on the memory are much better than those for the disk. Thus, the size of each of the blocks is set so as to be consistent with the unit of disk I/O to minimize the number of disk accesses.

Non-patent Documents 5 to 7 below each propose an idea of physical arrangement of data with the B-tree. Non-patent Document 5 below describes that, if a reference interval is less than or equal to five minutes, it is effective to place data in the memory rather than on the hard disk (5 minute rule), and if the number of instructions can be reduced by one every second by placing 10 bytes in the memory, this configuration is effective even if it uses more memory.

Below, the 5 minute rule will be described more in detail. The 5 minute rule is a turning point for deciding whether the placement of data in the memory is beneficial or not according to whether the following condition is satisfied or not, and if the reference interval R is five minutes, the following condition is satisfied.

$$(A/R) - (M*B) = 0$$

$B<Bmax, A=2000, M=0.005, B=1333$

Here, R is a reference interval, M is a unit price per byte of the memory, A is a unit price per bandwidth of the disk, B is a data size, and Bmax is a block size of the disk.

Non-patent Document 6 below describes that, in the environment 10 years after of Non-patent Document 1, it is effective to place blocks, randomly accessed at reference intervals of less than or equal to five minutes and blocks sequentially accessed at reference intervals of less than or equal to one minute, in the memory rather than on the hard disk. Further, in Non-patent Document 6 below, the appropriate block size for the B-tree is obtained on the basis of the time required for accessing the block modeled with the bandwidth and the latency of the disk, and the degree of narrowing the searching target by accessing the block.

Non-patent Document 7 below describes that, in the environment 20 years after of Non-patent Document 1 below, the 5 minute rule was established between the memory and the flash memory. Further, it also describes that the reference interval for storing data that have been stored in the disk into the flash memory is effectively two hours. In Non-patent Document 7 below, concerning the block size for the B-tree, it is effective to set the size of the disk to 512 KB and the size of the flash memory to 2 KB.

As a technique for improving the database performance as described above, an ORACLE (registered trademark) optimizer exists. Non-patent Document 8 below describes that, in a cost base optimizer (CBO), an operation cost COST used for preparing an appropriate implementation plan supporting a SQL statement is calculated through the following equation.

$$COST = \frac{IO\_COST \times SREADTIM + CPU\_COST/(CPUSPEED \times 1000)}{SREADTIM} \quad \text{[Formula 1]}$$

The CPU_COST is a value that is in proportion to the number of cycles of a central processing unit (CPU) necessary for operation, and the IO_COST is a value that is in proportion to the number of blocks read through the operation. The SREADTIM is an average response time (msec) of random read from a disk with a single block, and the CPUSPEED is an average number of cycles (MHz) per second.

Non-patent Document 9 below describes that the number of blocks accessed in an insertion manipulation is calculated as a cost necessary for the insertion manipulation in the following manners (see pp. 20).

Insertion cost=search cost+rewrite data block+rewrite
index block+split rewrite=(3+1)+1+1+
2=8blocks)

In Non-patent Document 9 below, a user needs to input an appropriate value for the number of the "split rewrite," and by assuming that the height of the B-tree is 3, 3 is set in the "search cost." Further, by assuming that the time required for access is constant, this time is calculated in the following manners (see pp. 371).

Block access cost=disk access time to a block from a
random starting location=average disk seek
time+average rotational delay+block transfer Patent Document 1 below proposes a database management system that selects an access path by considering the frequency of accesses to adjacent blocks. In the method described in Patent Document 1 below, an estimated time for execution is roughly calculated on the basis of the time for accessing adjacent blocks in the disk, the time required for accessing blocks that are not adjacent, the time required for processing each row, the number of blocks to be accessed, and the number of accesses to blocks that are not adjacent.

RELATED DOCUMENT

Patent Document

Patent Document 1: Japanese Patent Application Laid-open No. H02-54347

Non-Patent Document

Non-patent Document 1: Comer, D., "Ubiquitous B-Tree," ACM Computing Surveys, vol. 11, no. 2, p. 121-137, June 1979

Non-patent Document 2: "Oracle Database Concepts," 10g Release 2, parts number: B19215-02, March 2006 (FIGS. 5-7), http://otndnld.oracle.co.jp/document/products/oracle10g/10 2/doc_cd/server.102/B19215-02.pdf Non-patent Document 3: Drepper, U., "What Every Programmer Should Know about Memory," Red Hat Inc., Nov. 21, 2007, http://people.redhat.com/drepper/cpumemory.pdf Non-patent Document 4: Mohan, C., "Implications of Storage Class Memories (SCM) on Software Architectures," 13th International Workshop on High Performance Transaction Systems (HPTS), October 2009, http://www.hpts.ws/session2/mohan.pdf Non-patent Document 5: Gray, J. and Putzolu, G. F., "The 5 Minute Rule For Trading Memory for Disc Accesses and The 10 Byte Rule for Trading Memory for CPU Time," Proceedings of SIGMOD 87, pp. 395-398, June 1987.

Non-patent Document 6: Gray, J. and Graefe, G., "The Five-Minute Rule Ten Years Later, and Other Computer Storage Rules of Thumb," SIGMOD Record 26, 4, Dec. 1997.

Non-patent Document 7: Graefe, G., "The Five-Minute Rule Twenty Years Later, and How Flash Memory Changes the Rules," Proceedings of the Third International Workshop on Data Management on New Hardware, June 2007.

Non-patent Document 8: "Mongai fushutsu no Oracle genba waza" Keiji Oda, Chapter 4, Study on Optimizer, which is a brain for Oracle database, http://www.oracle.com/technology/global/jp/pub/jp/db_magazine/mongai/chapter4_2.html#part2

Non-patent Document 9: Sam S. Lightstone, Toby J. Teorey, Tom Nadeau., "Physical Database Design: the database professional's guide to exploiting indexes, views, storage, and more (The Morgan Kaufmann Series in Data Management Systems)," Morgan Kaufmann; 4th Revised edition, 2007.

SUMMARY OF THE INVENTION

As described above, various methods have been proposed for improving the performance of the database by taking into consideration specifications of various hardware resources realizing the database system. For example, Non-patent Documents 5 to 7 above propose optimizing physical arrangement of data to solve the problem in that access to the secondary storage (auxiliary storage) such as a hard disk serves as the bottleneck.

In recent years, with a reduction in prices of memories and an increase in the volume of the memories, the memories can store the large number of blocks with the B-tree. In such a situation, the disk accesses do not serve as the bottleneck in the database performance. Further, the flash memories have been increasingly used in place of the disk as the secondary storage.

Non-patent Documents 3 and 4 above describe latencies, bandwidths, and prices as specifications concerning a cache, a memory, a flash, and a disk, which are storage media (see FIG. 11). For example, according to Non-patent Document 3 above, access to data in L2 cache in a certain CPU causes delay of 14 cycles or less. This delay generally corresponds to 0.005 (us) in a CPU with 2.5 to 3.0 (GHz). Note that the latency of the flash in FIG. 11 is a read latency.

As described above, the hardware environment that can realize the database system diversifies. This means that the performance cannot be improved if methods are not appropriately selected according to the environment that realizes the database system. Thus, it is significantly important to estimate the database performance such as the time required for database manipulations. In this respect, for example, Patent Document 1, and Non-patent Documents 8 and 9 above estimate the operation cost and the processing time to generate an appropriate execution plan.

However, there is a problem that these estimation methods have poor accuracy. This is because, for example, these methods do not take into consideration a configuration mode of index blocks, manipulation methods to index blocks, specific processes of these manipulations, and physical arrangements of index blocks. The configuration mode includes, for example, a mode in which entries are stored in each of the blocks in a manner such that the entries are sorted, and a mode in which the entries are stored without being sorted. Further, as for the block searching, the manipulation method includes, for example, a method of sequentially searching entries from the top, and a method of performing a search through a binary search method. As for the entry insertion, the manipulation method includes, for example, a method of inserting an entry into the top of the available area, and a method of inserting an entry into an appropriate position in the entries that have been sorted. The specific process includes, for example, a process of block division performed during entry insertion. The physical arrangement represents positions (storage medium) where target blocks are stored.

These factors largely affect the accuracy of estimation of the database performance having the index blocks applied thereto.

An object of the present invention is to provide a technique of highly accurately estimating a time required for manipulation to a database having tree-structured indexes applied thereto.

Each aspect of the present invention employs the following configurations to solve the problems described above.

A first aspect of the present invention relates to a database performance estimation device for a database containing a tree-structured index block. The database performance estimation device according to the first aspect includes: a data acquiring unit that, for the index block, acquires configuration mode data indicating any one of at least two configuration modes, an average number (m) of entries per block, an entry processing time (a) indicating an average processing time per entry, a write ratio (w) indicating a ratio of an insert manipulation relative to all the manipulations, a latency (L) concerning a storage medium storing the index block, and an average branch block height (h); a searching time calculation unit that has at least two types of calculation methods using the latency (L), the entry processing time (a), and the average number (m) of entries per block and supporting at least two searching methods related to the at least two configuration modes, and acquires, as a child block searching time (d) and a leaf block scanning time (s), an average time required for identifying a target entry in a block, this average time being calculated by switching the at least two types of calculation methods according to the configuration mode data acquired by the data acquiring unit, and performing the switched calculation method; an inserting time calculation unit that has at least two types of calculation methods supporting at least two entry inserting methods related to the at least two configuration modes, and including a calculation method using the latency (L) and the entry processing time (a) and a calculation method using the latency (L), the entry processing time (a), and the average number (m) of entries per block, and acquires an entry inserting time (i) indicating an average time required for inserting a target entry in a leaf block by switching the at least two types of calculation methods according to the configuration mode data acquired by the data acquiring unit and performing the switched calculation method; and a processing time estimation unit that calculates an average time required for identifying a target leaf block per one manipulation performed to the index block by multiplying the average branch block height (h) by the child block searching time (d), calculates an average time required for searching for a target entry in the identified leaf block per one manipulation performed to the index block using the leaf block scanning time (s) and the write ratio (w), and calculates an average time required for inserting a target entry in the identified leaf block per one manipulation performed to the index block using the entry inserting time (i) and the write ratio (w), thereby estimating a total of the average times calculated as an average processing time per one manipulation performed to the index block.

A second aspect of the present invention relates to a database performance estimation device for a database containing a tree-structured index block. The database performance estimation device according to the second aspect includes: a first data acquiring unit that, for the index block, acquires a write ratio (w) indicating a ratio of an insert manipulation relative to all the manipulations and an average branch block height (h), and acquires a second latency concerning a second storage medium, a cache miss ratio indicating a probability that a target portion of the index block is not stored in a first storage medium, and needs to be transferred from the second storage medium, and a data transfer time per block from the second storage medium to the first storage medium; a second data acquiring unit that acquires a first child block searching time (d) indicating an average time required for identifying a child block from a block stored in the first storage medium, a first leaf block scanning time (s) indicating an average time required for identifying a target entry in a leaf block stored in the first storage medium, and a first entry inserting time (i) indicating an average time required for inserting a target entry in a leaf block stored in the first storage medium; an additional time calculation unit that calculates an additional time related to a cache miss by multiplying the cache miss ratio by a value obtained by adding, to the second latency, the data transfer time per block from the second storage medium to the first storage medium; an individual time calculation unit that calculates a second child block searching time (d'), a second leaf block scanning time (s'), and a second entry inserting time (i') by adding the additional time to the first child block searching time (d), the first leaf block scanning time (s), and the first entry inserting time (i); and a processing time estimation unit that calculates an average time required for identifying a target leaf block per one manipulation performed to the index block by multiplying the second child block searching time (d') by the average branch block height (h), calculates an average time required for searching for a target entry in the identified leaf block per one manipulation performed to the index block using the second leaf block scanning time (s') and the write ratio (w), and calculates an average time required for inserting a target entry in the identified leaf block per one manipulation performed to the index block using the second entry inserting time (i') and the write ratio (w), thereby estimating a total of the average times calculated as an average processing time per one manipulation performed to the index block.

A third aspect of the present invention relates to a database performance estimation method for a database containing a tree-structured index block. In the database performance estimation method according to the third aspect, a computer: acquires, in connection with the index block, configuration mode data indicating any one of at least two configuration modes, an average number (m) of entries per block, an entry processing time (a) indicating an average processing time per entry, a write ratio (w) indicating a ratio of an insert manipulation relative to all the manipulations, a latency (L) concerning a storage medium storing the index block, and an average branch block height (h); acquires an average time required for identifying a target entry in a block as a child block searching time (d) and a leaf block scanning time (s), the average time being calculated by switching, according to the configuration mode data, at least two types of calculation methods using the latency (L), the entry processing time (a), and the average number (m) of entries per block and supporting at least two searching methods related to the at least two configuration modes, and performing the switched calculation method; acquires an entry inserting time (i) indicating an average time required for inserting a target entry in a leaf block by switching, according to the configuration mode data, at least two types of calculation methods supporting at least two entry inserting methods related to the at least two configuration modes, and including a calculation method using the latency (L) and the entry processing time (a) and a calculation method using the latency (L), the entry processing time (a), and the average number (m) of entries per block; calculates an average time required for identifying a target leaf block per one manipulation performed to the index block by multiplying the average branch block height (h) by the child block searching time (d); calculates an average time required for searching for a target entry in the identified leaf block per one manipulation performed to the index block using the leaf block scanning time (s) and the write ratio (w); calculates an average time required for inserting a target entry in the identified leaf block per one manipulation performed to the index block using the entry inserting time (i) and the write ratio (w); and estimates a total of the average times calculated as an average processing time per one manipulation performed to the index block.

A fourth aspect of the present invention relates to a database performance estimation method for a database containing a tree-structured index block. In the database performance estimation method according to the fourth aspect, a computer: acquires, in connection with the index block, a write ratio (w) indicating a ratio of an insert manipulation relative to all the manipulations and an average branch block height (h); acquires a second latency concerning a second storage medium, a cache miss ratio indicating a probability that a target portion of the index block is not stored in a first storage medium, and needs to be transferred from a second storage medium, and a data transfer time per block from the second storage medium to the first storage medium; acquires a first child block searching time (d) indicating an average time required for identifying a child block from a block stored in the first storage medium, a first leaf block scanning time (s) indicating an average time required for identifying a target entry in a leaf block stored in the first storage medium, and a first entry inserting time (i) indicating an average time required for inserting a target entry in the leaf block stored in the first storage medium; calculates an additional time related to a cache miss by multiplying the cache miss ratio by a value obtained by adding, to the second latency, the data transfer time per block from the second storage medium to the first storage medium; calculates a second child block searching time (d'), a second leaf block scanning time (s'), and a second entry inserting time (i') by adding the additional time to the first child block searching time (d), the first leaf block scanning time (s), and the first entry inserting time (i); calculates an average time required for identifying a target leaf block per one manipulation performed to the index block by multiplying the second child block searching time (d') by the average branch block height (h); calculates an average time required for searching for a target entry in the identified leaf block per one manipulation performed to the index block using the second leaf block scanning time (s') and the write ratio (w); calculates an average time required for inserting a target entry in the identified leaf block per one manipulation performed to the index block using the second entry inserting time (i') and the write ratio (w); and estimates a total of the average times calculated as an average processing time per one manipulation performed to the index block.

It should be noted that other aspects of the present invention may include a computer program that causes a computer to realize the configuration of each of the aspects described above, and a computer-readable storage medium that stores such a computer program. This storage medium includes a non-transitory tangible medium.

According to each of the aspects described above, it is possible to provide a technique of estimating the time required for manipulation to the database having the tree-structured indexes applied thereto in a highly accurate manner.

BRIEF DESCRIPTION OF THE DRAWINGS

FIG. 11 is a diagram illustrating an example of specifications of each storage media.

DESCRIPTION OF EMBODIMENTS

Hereinbelow, an exemplary embodiment of the present invention will be described. Note that each exemplary embodiment described below is merely an example, and the present invention is not limited to the configurations of the exemplary embodiments described below.

[First Exemplary Embodiment]

Below, a database performance estimation device serving as a first exemplary embodiment according to the present invention will be described. The database performance estimation device according to the first exemplary embodiment estimates (evaluates), as a database performance, the time required for manipulating a database having a tree-structured index applied thereto. In this exemplary embodiment, it is only necessary that indexes applied to the database serving as a target of estimation are stored in a tree-structured manner, and this exemplary embodiment is not limited to a technique called a B-tree.

[Device Configuration]

Figure 1:
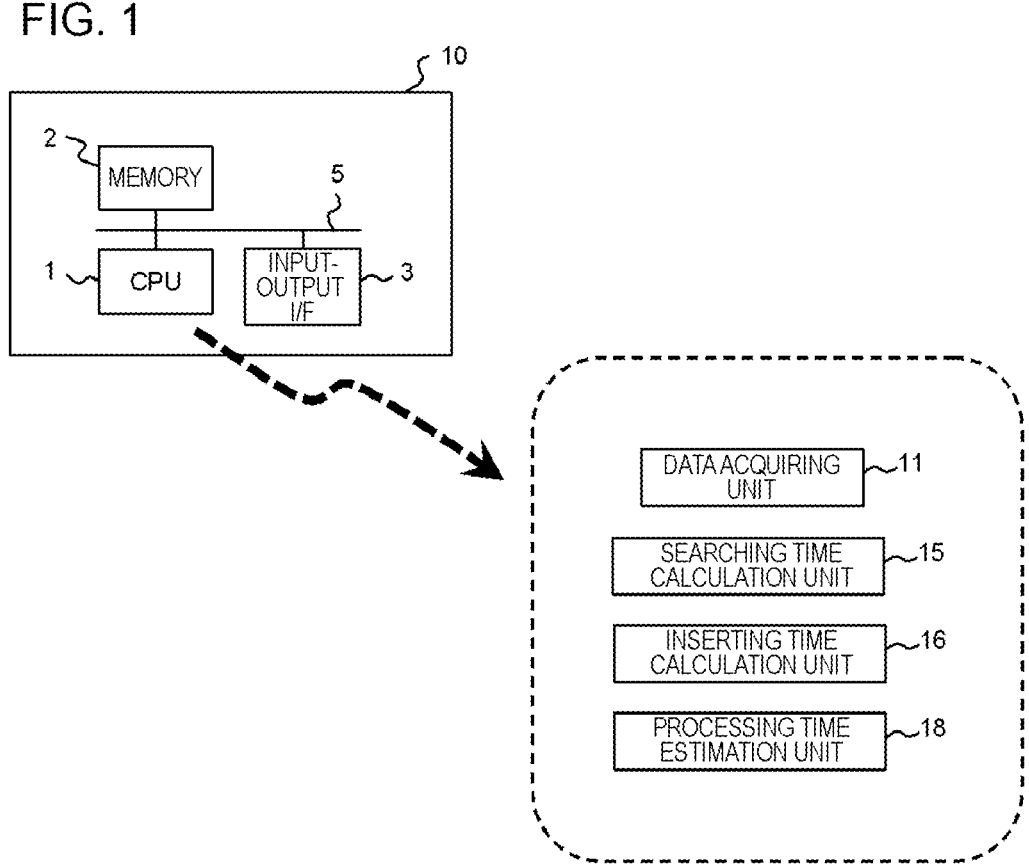
FIG. 1 is a schematic view illustrating an example of a configuration of a database performance estimation device according to a first exemplary embodiment.

FIG. 1 is a schematic view illustrating an example of a configuration of the database performance estimation device according to the first exemplary embodiment. As illustrated in FIG. 1, a database performance estimation device (hereinafter, simply referred to as an estimation device) 10 includes, as a hardware configuration, a CPU 1, a memory 2, and an input-output interface (I/F) 3. The memory 2 includes, for example, a random access memory (RAM), a read only memory (ROM), a hard disk, and a portable storage medium. The input-output I/F 3 is connected, for example, to a communication device that communicates with other devices. The input-output I/F 3 may be connected to a display device or a user interface device such as an input device. Note that this exemplary embodiment does not limit the hardware configuration of the estimation device 10.

The estimation device 10 estimates an average processing time per manipulation performed for the index block as an estimation of the performance of the database having the tree-structured index block. The database serving as the target of estimation by the estimation device 10 may be realized on the estimation device 10 itself, or may be realized on another computer.

Figure 10:
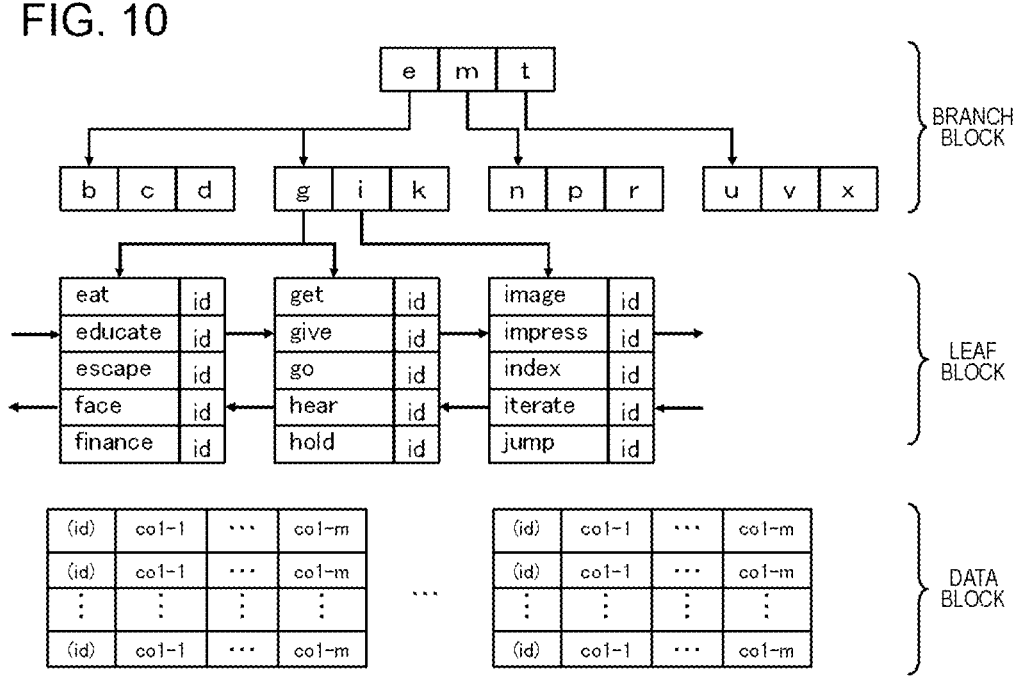
FIG. 10 is a diagram illustrating an example of a configuration of a B-tree index.

The database serving as the target of estimation has, for example, a configuration as illustrated in FIG. 10 as an example. Hereinafter, in each index block linked with an identifier in an index entry, the branch block containing the index entry is referred to as a parent block, and the leaf block identified with an identifier in this index entry or another branch block is also referred to as a child block.

As illustrated in FIG. 1, the estimation device 10 according to the first exemplary embodiment includes, for example, a data acquiring unit 11, a searching time calculation unit 15, an inserting time calculation unit 16, and a processing time estimation unit 18. Each of the processing units is realized with the CPU 1 running a program stored in the memory 2. The program is installed, for example, from a removable storage medium such as a compact disc (CD), and a memory card, or from another computer on the network through the input-output I/F 3, and is stored in the memory 2.

In connection with the index block of the database serving as the target of estimation, the data acquiring unit 11 acquires configuration mode data indicating any one of at least two configuration modes, the average number (m) of entries per block, an entry processing time (a) indicating an average processing time per entry, a write ratio (w) indicating a ratio of an insert manipulation relative to all the manipulations, latency (L) concerning a storage medium storing index blocks, and an average branch block height (h).

The configuration mode data are data for identifying a configuration mode employed in the index block serving as the target of estimation from among at least two configuration modes. Here, the configuration mode means a mode that can be employed for the index blocks serving as the target of estimation, which includes a mode concerning whether entries in the block are sorted or not, a method of searching entries in the block, and a manipulation method.

In the first exemplary embodiment, two configuration modes are supported. More specifically, the first configuration mode indicates a mode in which: entries in the block are not sorted; a method of sequentially searching entries from the top (hereinafter, referred to as a full search method) is employed as a searching method; and a method of inserting an entry into the top in the available area is employed as an entry inserting method. The second configuration mode indicates a mode in which: entries in the block are sorted; a method of searching through a binary search method (hereinafter, referred to as a binary search method) is employed as the searching method; and a method of inserting an entry into an appropriate position in the sorted entries is employed as the entry inserting method. Note that, in this exemplary embodiment, the configuration mode to be supported is not limited to those two configuration modes, and it may be possible to add other searching method and other entry inserting method to support three or more configuration modes.

The data acquiring unit 11 acquires each piece of information described above from a user using a user interface device connected to the input-output I/F 3. In this case, the data acquiring unit 11 causes a display device (not illustrated) to display a screen for inputting each piece of information, and thereby acquiring data inputted into this screen as the information described above. Further, the data acquiring unit 11 may acquire the information described above through communications from another device, or may acquire the information described above from a portable storage medium that stores the information described above.

The searching time calculation unit 15 uses the latency (L), the entry processing time (a), and the average number (m) of entries per block, which are acquired by the data acquiring unit 11, to calculate a child block searching time (d) and a leaf block scanning time (s). The child block searching time (d) indicates an average time required for identifying a certain child block (block located one step below) from a certain branch block. The leaf block scanning time (s) indicates an average time required for identifying a target entry in the leaf block. The searching time calculation unit 15 calculates the average time required for identifying the target entry in the branch block or the leaf block as the child block searching time (d) and the leaf block scanning time (s).

The searching time calculation unit 15 employs at least two types of calculation methods corresponding to at least two searching methods indicated in the two or more configuration modes, and using the latency (L), the entry processing time (a), and the average number (m) of entries per block. For example, the searching time calculation unit 15 employs two types of calculation methods corresponding to the full search method and the binary search method.

The searching time calculation unit 15 switches the two or more types of calculation methods according to the configuration mode data acquired by the data acquiring unit 11, and makes the calculation, thereby calculating the average time required for identifying the target entry in the block. The searching time calculation unit 15 acquires the calculated average time as the child block searching time (d) and the leaf block scanning time (s).

Described below is an example of the two or more types of calculation methods that the searching time calculation unit 15 has. Equation 1 below is an example of a calculation method of the first configuration mode (full search method), and Equation 2 below is an example of a calculation method of the second configuration mode (binary search method). The mark "*" in the following equations represents multiplier.

$$d = L + a*m, \ s = L + a*m \qquad \text{Equation 1}$$

$$d = (L+a)*\log_2 m, \ s = (L+a)*\log_2 m \qquad \text{Equation 2}$$

In the calculation corresponding to the full search method, it is assumed that all the entries in each of the blocks are searched, and the latency (L) is added to a value obtained by multiplying the entry processing time (a) by the average number (m) of entries per block, as indicated in Equation 1. On the other hand, in the calculation corresponding to the binary search method, it is assumed that the latency (L) and the entry processing time (a) are required for one comparison, and a value obtained by adding up the latency (L) and the entry processing time (a) is multiplied by the average comparison times at the time when the binary search is performed for the average number (m) of entries per block, as indicated in Equation 2.

It should be noted that the second term "(a*m)" in Equation 1 described above may be set to a term "(α*a* m)" in which a predetermined coefficient (α) is further multiplied to increase the accuracy of the number of entries referred to until the target entries are identified.

In accordance with the configuration mode data acquired by the data acquiring unit 11, the inserting time calculation unit 16 switches at least two types of calculation methods corresponding to the at least two entry inserting processes indicated in the two or more configuration modes, and makes the calculation, thereby calculating the entry inserting time (i)

indicating the average time required for inserting the target entry into the leaf block. The inserting time calculation unit 16 employs, as the two or more types of calculation methods, a calculation method using the latency (L) and the entry processing time (a), and a calculation method using the latency (L), the entry processing time (a), and the average number (m) of entries per block.

Described below is an example of the two or more types of calculation methods that the inserting time calculation unit 16 has. Equation 3 below is an example of a calculation method corresponding to the first configuration mode, and Equation 4 below is an example of a calculation method corresponding to the second configuration mode.

$$i = L + a \qquad \text{Equation 3}$$

$$i = (L+a) * \log_2 m + a * m \qquad \text{Equation 4}$$

In the calculation corresponding to the first configuration mode, one entry is inserted into the top of the available area, and hence, the available latency (L) and the entry processing time (a) are added up. On the other hand, in the calculation corresponding to the second configuration mode, the time required for identifying a portion for inserting the entry and the time required for sequentially moving the entries that have been already inserted to insert the new entry are added together. More specifically, the first-half term in Equation 4 indicates the former time and the second-half term indicates the latter time. In the example of Equation 4, the first-half term of the Equation 4 is the same as that of Equation 2. Further, the time required for sequentially moving the entries (the second-half term) can be calculated (a*m) by multiplying the average number (m/2) of entries that need to be moved by the time (2*a) required for moving one entry. The time required for moving one entry includes a time (a) required for reading the entry and a time (a) required for writing the entry in the moved position.

It should be noted that the second term "(a*m)" in Equation 4 described above may be set to a term "(α*a* m)" in which a predetermined coefficient (α) is further multiplied to increase the accuracy of the average number of entries that need to be moved.

The processing time estimation unit 18 uses the child block searching time (d) and the leaf block scanning time (s) calculated by the searching time calculation unit 15, the entry inserting time (i) calculated by the inserting time calculation unit 16, and information acquired by the data acquiring unit 11 to calculate the average processing time (t) per one manipulation performed to the index block. The processing time estimation unit 18 estimates the calculated time as a time required for manipulating the database. Note that the time required for manipulating the data block is not taken into account in the estimation of the time. This is because the time required for manipulating the data block has a less effect on the performance of the entire database than the time required for manipulating the index block has. In other words, the manipulation to the index block is performed more frequently than the manipulation (processing) to the data block.

The processing time estimation unit 18 calculates, for each particular process constituting one manipulation performed to the index block, the average time required for performing the particular process, and adds up the average times, thereby calculating the average processing time (t) per one manipulation performed to the index block. More specifically, the processing time estimation unit 18 calculates the average time (hereinafter, referred to as a leaf-block identifying time) required for identifying the target leaf block per one manipulation performed to the index block, the average time (hereinafter, referred to as an entry identifying time) required for searching the identified leaf block for the target entry per one manipulation performed to the index block, and the average time (hereinafter, referred to as an entry inserting time) required for inserting the target entry into the identified leaf block per one manipulation performed to the index block.

For example, the processing time estimation unit 18 uses Equation 5 below, and calculates the final average processing time (t).

$$t = h*d + (1-w)*s + w*i \qquad \text{Equation 5}$$

As can be understood from Equation 5, the processing time estimation unit 18 multiplies the average branch block height (h) by the child block searching time (d), thereby calculating the leaf-block identifying time (the first term in Equation 5). The processing time estimation unit 18 uses the leaf block scanning time (s) and the write ratio (w), thereby calculating the entry identifying time (the second term in Equation 5). The processing time estimation unit 18 uses the entry inserting time (i) and the write ratio (w), thereby calculating the entry inserting time (the third term in Equation 5).

[Example of Operation]

Figure 2:
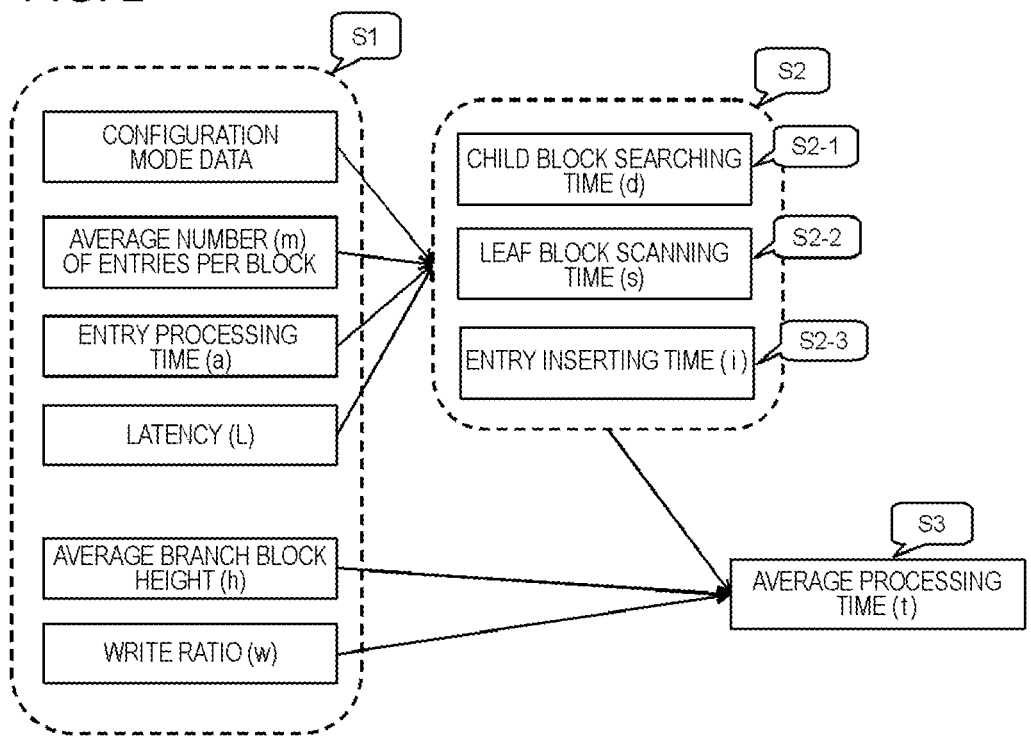
FIG. 2 is a diagram illustrating a flow of data and an example of an operation performed by the database performance estimation device according to the first exemplary embodiment.

FIG. 2 is a diagram illustrating a flow of data and an example of an operation performed by the estimation device 10 according to the first exemplary embodiment. In the estimation device 10, the data acquiring unit 11 first acquires the configuration mode data, the average number (m) of entries per block, the entry processing time (a), the latency (L), the average branch block height (h), and the write ratio (w) (S1).

Next, the searching time calculation unit 15 and the inserting time calculation unit 16 use the average number (m) of entries per block, the entry processing time (a), and the latency (L) to make a calculation according to the configuration mode data (S2). With this calculation, the child block searching time (d), the leaf block scanning time (s), and the entry inserting time (i) can be obtained (S2-1, S2-2, and S2-3). The processes S2-1, S2-2, and S2-3 may be performed in parallel, or may be performed sequentially in predetermined order.

Finally, the processing time estimation unit 18 uses the child block searching time (d), the leaf block scanning time (s), and the entry inserting time (i), which are calculated in the process S2, and the average branch block height (h) and the write ratio (w), which are acquired by the data acquiring unit 11, thereby calculating the average processing time (t) (S3).

[Operation and Effect of First Exemplary Embodiment]

As described above, the estimation device 10 according to the first exemplary embodiment on the basis of the information acquired by the data acquiring unit 11, the time required for various particular processes performed to the index block are calculated by the searching time calculation unit 15 and the inserting time calculation unit 16. More specifically, the average time (child block searching time (d)) required for making an identification from a certain branch block to a certain child block (block located one step below), the average time (leaf block scanning time (s)) required for identifying the target entry in the leaf block, and the average time (entry inserting time (i)) required for inserting the target entry into the leaf block are calculated.

At this time, the methods of calculating the child block searching time (d), the leaf block scanning time (s), and the entry inserting time (i) are switched according to the configuration mode data indicating the configuration mode employed in the index block serving as the target of estimation. More specifically, for the index block for which the full search method is employed, calculation is made in a manner that reflects details of processes through the full search method.

For the index block for which the binary search method is employed, calculation is made in a manner that reflects details of the processes through the binary search method. Similarly, to obtain the entry inserting time, calculation is made in a manner that reflects details of processes through the entry inserting method that the index block employs.

More specifically, in the first exemplary embodiment, the average processing time (t) per one manipulation performed to the index block is calculated in a state where the configuration mode of the index block and the manipulation method for the index block are reflected. Thus, according to the first exemplary embodiment, it is possible to estimate the time required for manipulation performed to the database having the tree-structured index added thereto in a highly accurate manner.

[Second Exemplary Embodiment]

Next, an estimation device 10 according to a second exemplary embodiment will be described with focus being placed on things different from those in the first exemplary embodiment. The estimation device 10 according to the second exemplary embodiment further takes into consideration the time required for a block division process at the time of inserting the entry, and estimates the time required for manipulation performed to the database having the tree-structured index added thereto. Note that, in the following description, explanation of the details same as those in the first exemplary embodiment is not repeated.

[Device Configuration]

Figure 3:
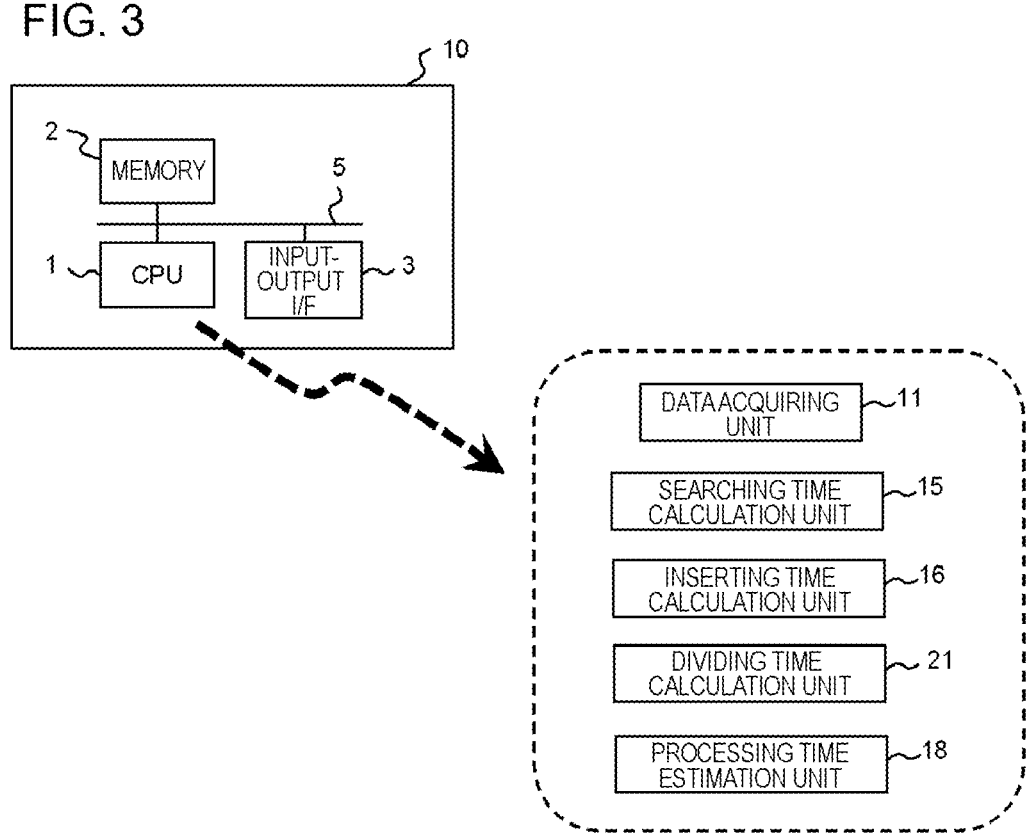
FIG. 3 is a schematic view illustrating an example of a configuration of a database performance estimation device according to a second exemplary embodiment.

FIG. 3 is a schematic view illustrating an example of a configuration of the estimation device 10 according to the second exemplary embodiment. In addition to the configuration of the first exemplary embodiment, the estimation device 10 according to the second exemplary embodiment further includes a dividing time calculation unit 21. The dividing time calculation unit 21 is also realized with the CPU 1 running a program stored in the memory 2.

In addition to the information described in the first exemplary embodiment, the data acquiring unit 11 further acquires the maximum number (k) of entries in each of the blocks and the number (j) of block divisions per one manipulation performed to the index block. Further, the data acquiring unit 11 according to the second exemplary embodiment makes a calculation using the acquired maximum number (k) of entries in each of the blocks to acquire the average number (m) of entries per block. More specifically, the data acquiring unit 11 makes the calculation by multiplying the maximum number (k) of entries in each of the blocks by a predetermined usage ratio per block. It is only necessary that the data acquiring unit 11 retains this predetermined usage ratio in advance, and the predetermined usage ratio is set, for example, to 0.75.

The dividing time calculation unit 21 uses the latency (L), the entry processing time (a), and the maximum number (k) of entries in each of the blocks acquired by the data acquiring unit 11, and calculates a division process unit time (c) indicating the average time required for one block division process. The dividing time calculation unit 21 switches the two or more types of calculation methods according to the configuration mode data acquired by the data acquiring unit 11, and performs the calculation method, thereby calculating the division process unit time (c).

The dividing time calculation unit 21 supports at least two block division methods indicated in the two or more configuration modes, and employs at least two types of calculation methods using the latency (L), the entry processing time (a), and the maximum number (k) of entries in each of the blocks. The dividing time calculation unit 21 according to this exemplary embodiment employs two types of calculation methods each corresponding to two block division methods differing according to whether entries in the block are sorted or not.

Described below are examples of the two or more types of calculation methods that the dividing time calculation unit 21 supports. Equation 6 below is an example of a calculation method corresponding to the first configuration mode, and Equation 7 below is an example of a calculation method corresponding to the second configuration mode.

$$c=(L+1.5*a)*k \qquad \text{Equation 6}$$

$$c=a*k+2L \qquad \text{Equation 7}$$

In the first configuration mode, the block division process is performed in the case where the number of entries in the block is the maximum number of entries. In the block division process, all the entries are referred to in order to identify entries to be transferred, and it is assumed that half of the entries are transferred. In other words, in this assumption, only reference is made to half of the entries in the block serving as the target of division, and reference and writing are performed to the remaining half of the entries. Thus, in the block division process indicated in the first configuration mode, a process for one entry takes one latency (L) and 1.5 times the entry processing time (a). The idea that every process performed to one entry takes one latency (L) is based on an idea that the ratio of the entries to be transferred and the ratio of the entries that are only referred to are equal on average, and one latency (L) is necessary for each transfer whereas one latency (L) is necessary for each reference. Thus, the final processing time is obtained by multiplying the processing time for one entry by the maximum number of entries, so that the calculation corresponding to the first configuration mode is given as Equation 6 above.

It should be noted that, if the condition for performing the block division process is set so that the ratio of the number of entries in the block relative to the maximum number of the entries exceeds a predetermined ratio β, Equation 6 above may be replaced with an equation ((L+1.5*a)*k*β) in which β is multiplied by the maximum number (k) of entries in each of the blocks.

On the other hand, in the second configuration mode, the block division process is performed in the case where the number of entries in the block is the maximum number of entries, and entries in the block are sorted. Thus, it is assumed that the block division process is performed in a manner such that entries located at the center or thereafter are collectively transferred to another block. In this manner, one latency (L) is necessary for access to the entry located at the center, and one latency (L) is necessary for access to the first writing (transfer), whereby 2 L is necessary for one block division process. Further, reference and writing (transferring) are performed for half of the entries. Thus, one entry processing time (a) (=(1/2)*2*a) is required for a process performed to one entry in the block division process. As a result, the calculation corresponding to the second configuration mode is given as Equation 7.

Similarly, for Equation 7, by changing the ratio of the number of entries to be transferred, the value "2" in the second term may be changed, or the first term may be multiplied by a predetermined coefficient. For example, if the condition for performing the block division process is set such that the ratio of the number of entries in the block relative to the maximum number of entries exceeds a predetermined ratio β, the predetermined coefficient multiplied by the first term may be determined to be a value obtained by taking this predetermined ratio β and the ratio of the number of entries to be transferred into consideration.

The processing time estimation unit 18 multiplies the number (j) of block divisions acquired by the data acquiring unit 11 by the division process unit time (c) calculated by the dividing time calculation unit 21 to further calculate the average time required for performing the block division process per one manipulation performed to the index block, and further adds this average time required for performing the block division process to the total of the other average times described in the first exemplary embodiment to calculate the average process time per one manipulation performed to the index block.

For example, the processing time estimation unit 18 uses Equation 8 below to calculate the final average processing time (t). In Equation 8 below, the final term corresponds to the average time required for performing the block division process per one manipulation performed to the index block.

$$t = h*d + (1-w)*s + w*i + c*j \qquad \text{Equation 8}$$

[Example of Operation]

Figure 4:
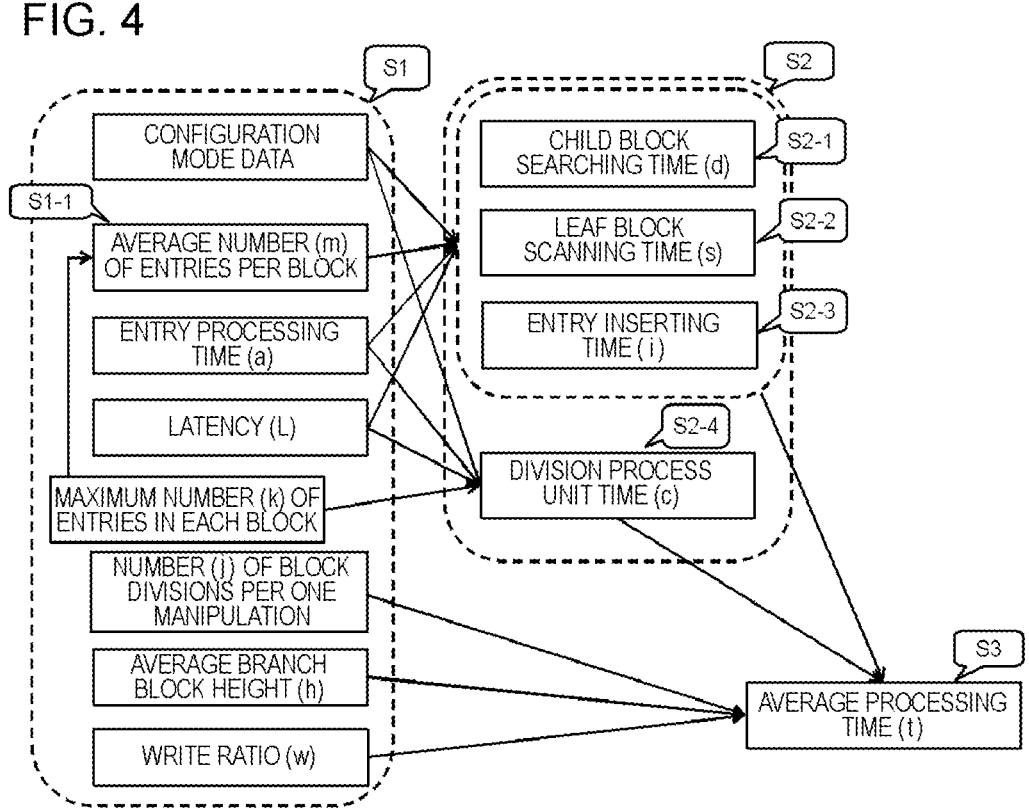
FIG. 4 is a diagram illustrating a flow of data and an example of an operation performed by the database performance estimation device according to the second exemplary embodiment.

FIG. 4 is a diagram illustrating a flow of data and an example of an operation performed by the estimation device 10 according to the second exemplary embodiment. In the estimation device 10, the data acquiring unit 11 first acquires the maximum number (k) of entries in each of the blocks and the number (j) of block divisions per one manipulation (S1) in addition to each information described in the first exemplary embodiment. In the second exemplary embodiment, the data acquiring unit 11 uses the maximum number (k) of entries in each of the blocks to calculate the average number (m) of entries per block (S1-1).

In the second exemplary embodiment, the process S2 in Example of Operation in the first exemplary embodiment in FIG. 2 is performed such that the dividing time calculation unit 21 uses the entry processing time (a), the latency (L), and the maximum number (k) of entries in each of the blocks to make a calculation according to the configuration mode data (S2-4). With this operation, in addition to the child block searching time (d), the leaf block scanning time (s), and the entry inserting time (i), the division process unit time (c) is further calculated.

The processing time estimation unit 18 adds, to the value calculated in the first exemplary embodiment, a value obtained by multiplying the division process unit time (c) by the number (j) of block divisions per one manipulation, thereby calculating the average processing time (t) (S3).

[Operation and Effect of Second Exemplary Embodiment]

As described above, in the estimation device 10 according to the second exemplary embodiment, the division process unit time (c) indicating the average time required for performing one block division process is calculated by the dividing time calculation unit 21, and this division process unit time (c) is multiplied by the number (j) of block divisions per one manipulation, whereby the average time required for performing the block division process per one manipulation is calculated. Further, the average time required for performing the block division process is further added to the total of the leaf-block identifying time, the entry identifying time, and the entry inserting time, which have been described in the first exemplary embodiment, whereby the final average processing time (t) is calculated.

As described above, in the second exemplary embodiment, the average processing time (t) per one manipulation performed to the index block is calculated with the block division process being reflected as one of the detailed processes performed to the index block as manipulation. Thus, according to the second exemplary embodiment, it is possible to estimate the time required for manipulation to the database having the tree-structured index added thereto in a more accurate manner than that with the first exemplary embodiment.

Further, in the second exemplary embodiment, the method of calculating the division process unit time (c) is switched according to the configuration mode of the index block that affects the details of the block division process. As a result, by making a calculation in a manner that reflects process details through the block division process methods employed for the index block, the division process unit time (c) is calculated. Thus, according to the second exemplary embodiment, by considering the configuration mode of the index block, it is possible to obtain a highly accurate division process unit time (c).

[Third Exemplary Embodiment]

Below, an estimation device 10 according to a third exemplary embodiment will be described with focus being placed on things different from those in the first exemplary embodiment and the second exemplary embodiment. The estimation device 10 according to the third exemplary embodiment further takes physical arrangement of the index blocks into consideration, and estimates the time required for manipulation to the database. Note that, in the following description, explanation of the details same as those in the first exemplary embodiment and the second exemplary embodiment will not be repeated.

[Device Configuration]

Figure 5:
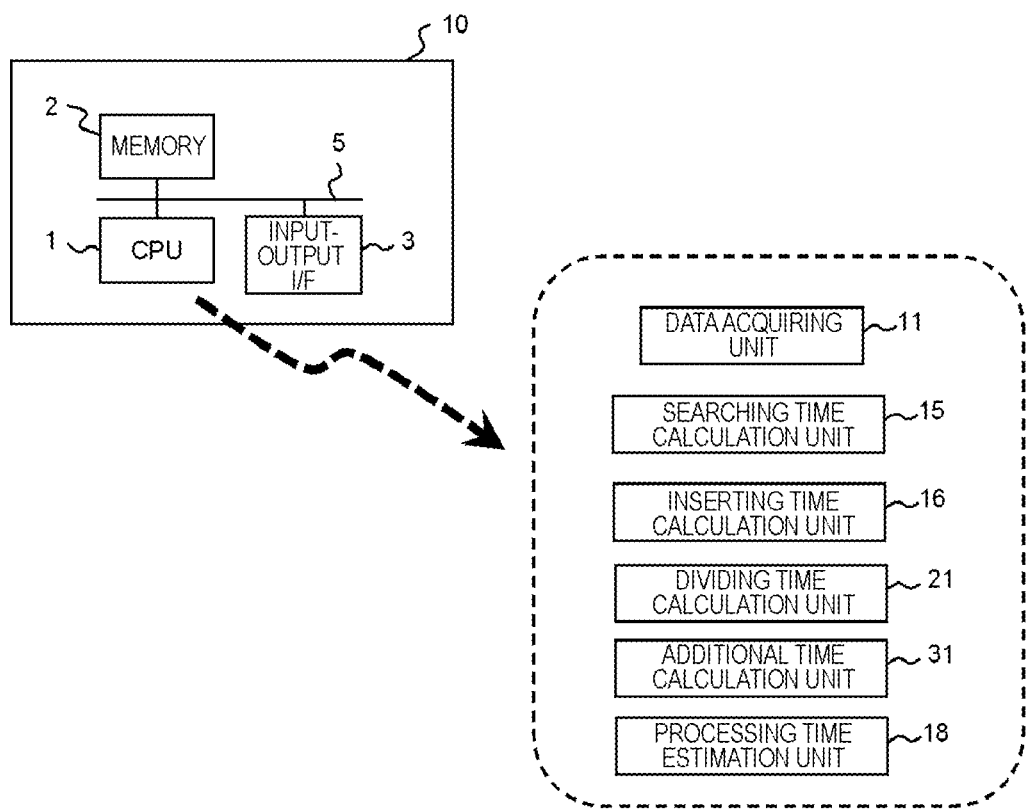
FIG. 5 is a schematic view illustrating an example of a configuration of a database performance estimation device according to a third exemplary embodiment.

FIG. 5 is a schematic view illustrating an example of a configuration of the estimation device 10 according to the third exemplary embodiment. In addition to the configuration of the second exemplary embodiment, the estimation device 10 according to the third exemplary embodiment further includes an additional time calculation unit 31. The additional time calculation unit 31 is also realized with the CPU 1 running a program stored in the memory 2.

In addition to the information described in the first exemplary embodiment, the data acquiring unit 11 further acquires a cache miss ratio (1−H) indicating a probability that a target portion of the index block is not stored in a first storage medium, and needs to be transferred from a second storage medium, and a data transfer time (u) per block from the second storage medium to the first storage medium. Further, the data acquiring unit 11 acquires, as the latency (L) described in the first exemplary embodiment, a first latency (L) concerning the first storage medium and a second latency (L') concerning the second storage medium. Note that the data acquiring unit 11 may acquire a cache hit ratio (H) indicating a probability that a target portion of the index block is stored in the first storage medium, and there is no need to transfer the target portion of the index block from the second storage medium, and calculate the cache miss ratio (1−H) on the basis of this cache hit ratio (H).

Here, the first storage medium represents a storage medium having a speed faster than the second storage medium, and a storage medium that stores part of the index block stored in the second storage medium. For example, in the example illustrated in FIG. 11, the first storage medium is a memory (DIMM DDR3), and the second storage medium is a disk (SATA). Note that the first storage medium may be a cache (L2), and the second storage medium may be a flash memory. Further, the first storage medium is called a main memory, a main storage, and a primary storage, and the second storage medium is called an auxiliary storage, and a secondary storage. This exemplary embodiment does not limit a specific embodiment of the first storage medium and the second storage medium.

The additional time calculation unit 31 calculates a time (hereinafter, referred to as a cache miss time) required for transferring a target index block, which is not stored in the first storage medium, from the second storage medium to the first storage medium, and storing the target index block, and multiplying this cache miss time by the cache miss ratio, thereby calculating an additional time related to the cache miss. In this exemplary embodiment, the cache miss time is calculated by adding the second latency (L') required for accessing the second storage medium to the data transfer time (u) required for transferring the target index block from the second storage medium to the first storage medium.

The searching time calculation unit 15 calculates a child block searching time (d') and a leaf block scanning time (s') according to the third exemplary embodiment by adding the additional time (u) calculated by the additional time calculation unit 31 to the child block searching time (d) and the leaf block scanning time (s) calculated through the method described in the first exemplary embodiment. For example, the searching time calculation unit 15 uses Equation 9 below to calculate the child block searching time (d') and the leaf block scanning time (s').

$$d'=d+(L'+u)*(1-H), s'=s+(L'+u)*(1-H) \quad \text{Equation 9}$$

The inserting time calculation unit 16 adds the additional time (u) calculated by the additional time calculation unit 31 to the entry inserting time (i) calculated through the method described in the first exemplary embodiment, thereby calculating an entry inserting time (i') according to the third exemplary embodiment. For example, the inserting time calculation unit 16 uses Equation 10 below to calculate the entry inserting time (i').

$$i'=i+(L'+u)*(1-H) \quad \text{Equation 10}$$

The dividing time calculation unit 21 adds the additional time (u) calculated by the additional time calculation unit 31 to the division process unit time (c) calculated through the method described in the second exemplary embodiment, thereby calculating a division process unit time (c') according to the third exemplary embodiment. For example, the dividing time calculation unit 21 uses Equation 11 below to calculate the division process unit time (c).

$$c'=c+(L'+u)*(1-H) \quad \text{Equation 11}$$

The processing time estimation unit 18 uses the child block searching time (d'), the leaf block scanning time (s'), the entry inserting time (i'), and the division process unit time (c'), which are calculated as described above, in a manner similar to that in the second exemplary embodiment, thereby calculating the average processing time (t) per one manipulation performed to the index block. More specifically, the processing time estimation unit 18 uses Equation 12 below to calculate the average processing time (t).

$$t=h*d'+(1-w)*s'+w*i'+c'*j \quad \text{Equation 12}$$

Figure 6:
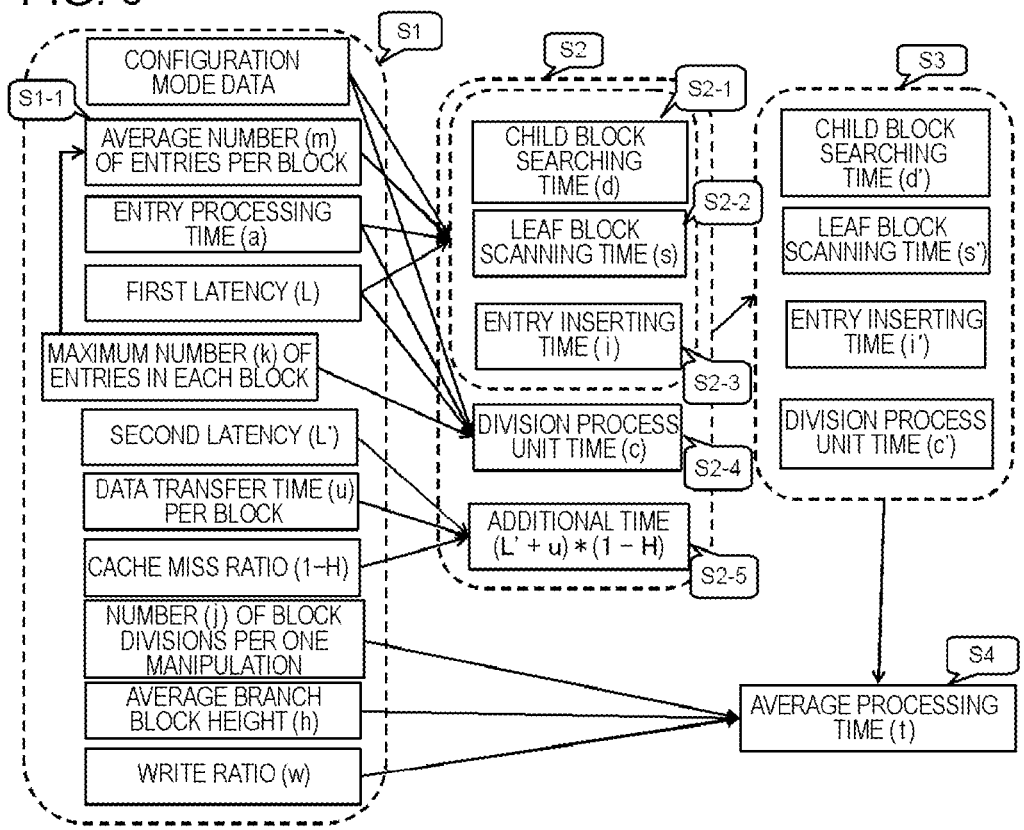
FIG. 6 is a diagram illustrating a flow of data and an example of an operation performed by the database performance estimation device according to the third exemplary embodiment.

FIG. 6 is a diagram illustrating a flow of data and an example of an operation performed by the estimation device 10 according to the third exemplary embodiment. In the estimation device 10, in addition to the information described in the second exemplary embodiment, the data acquiring unit 11 first acquires the data transfer time (u) per block and the cache miss ratio (1−H). Further, in the third exemplary embodiment, the first latency (L) and the second latency (L') are acquired as the latency (L) according to the first exemplary embodiment.

In the third exemplary embodiment, the process S2 described in Example of Operation in the second exemplary embodiment illustrated in FIG. 4 is performed such that the additional time calculation unit 31 uses the second latency (L'), the data transfer time (u) per block, and the cache miss ratio (1−H) to calculate the additional time concerning the cache miss (S2-5).

Next, in the third exemplary embodiment, the searching time calculation unit 15, the inserting time calculation unit 16, and the dividing time calculation unit 21 add the additional time to the child block searching time (d), the leaf block scanning time (s), the entry inserting time (i), and the division process unit time (c) (S3). The processing time estimation unit 18 uses the child block searching time (d'), the leaf block scanning time (s'), the entry inserting time (i'), and the division process unit time (c') each having the additional time added thereto, thereby calculating the average processing time (t) (S4).

[Operation and Effect of Third Exemplary Embodiment]

As described above, in the third exemplary embodiment, the processing time specifically occurring at the time of cache miss is calculated as the additional time (u), and the times required for various processes (child block searching time (d'), leaf block scanning time (s'), entry inserting time (i'), division process unit time (c')) are calculated in a manner that all these times include the additional time described above.

Thus, according to the third exemplary embodiment, the final average processing time (t) can be calculated with the details of each of the processes at the time of cache hit and cache miss being reflected. In other words, according to the third exemplary embodiment, it is possible to estimate the time required for manipulation to the database in a more accurate manner than that of the first exemplary embodiment and the second exemplary embodiment while the physical arrangement of the index blocks are being taken into consideration.

[Fourth Exemplary Embodiment]

Below, an estimation device 10 according to a fourth exemplary embodiment will be described with focus being placed on things different from those in the first exemplary embodiment to the third exemplary embodiment. With a configuration different from that in the third exemplary embodiment, the fourth exemplary embodiment estimates a time required for manipulation to the database while physical arrangement of index blocks are being taken into consideration. Note that, in the following description, explanation of the details same as those in the first exemplary embodiment to the third exemplary embodiment will not be repeated.

[Device Configuration]

Figure 7:
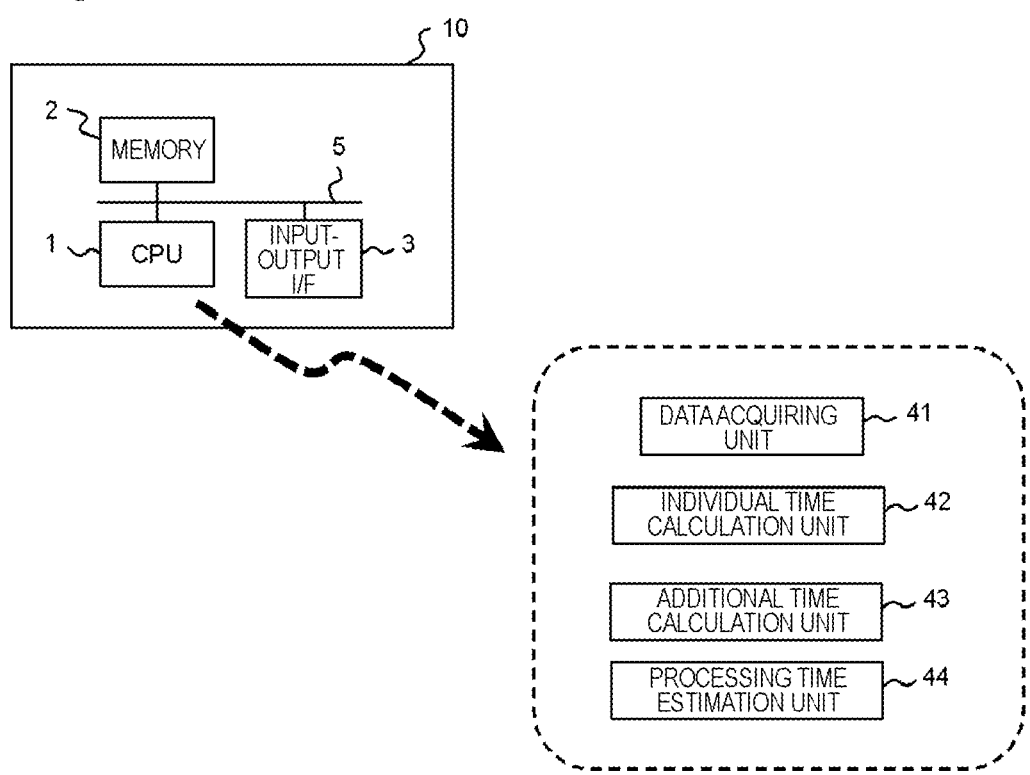
FIG. 7 is a schematic view illustrating an example of a configuration of a database performance estimation device according to a fourth exemplary embodiment.

FIG. 7 is a schematic view illustrating an example of a configuration of the estimation device 10 according to the fourth exemplary embodiment. The estimation device 10 according to the fourth exemplary embodiment includes, for example, a data acquiring unit 41, an individual time calculation unit 42, an additional time calculation unit 43, and a processing time estimation unit 44. Each of these processing units is realized with the CPU 1 running a program stored in the memory 2.

For the index block of the database, which is the target of estimation, the data acquiring unit 41 acquires a write ratio (w) indicating a ratio of an insert manipulation relative to all the manipulations, an average branch block height (h), a second latency (L') concerning the second storage medium, a cache miss ratio (1−H) indicating a probability that a target portion of the index block is not stored in the first storage medium, and needs to be transferred from the second storage medium, and a data transfer time (u) per block from the second storage medium to the first storage medium. Here, the write ratio (w), the average branch block height (h), the second latency (L'), the cache miss ratio (1−H), and the data transfer time (u) each have the same meanings as those in the first exemplary embodiment and the third exemplary embodiment.

Further, the data acquiring unit 41 acquires a first child block searching time (d) indicating an average time required for identifying a child block (another branch block or leaf block) from the branch block stored in the first storage medium, a first leaf block scanning time (s) indicating an average time required for identifying a target entry in the leaf block stored in the first storage medium, and a first entry inserting time (i) indicating an average time required for inserting the target entry into the leaf block stored in the first storage medium.

The data acquiring unit 41 acquires the information described above by causing a user to input the information using a user interface device connected to the input-output I/F 3. In this case, the data acquiring unit 41 causes a display device (not illustrated) to display a screen for inputting the information described above to acquire data inputted into this screen as the information described above. Further, the data acquiring unit 41 may acquire the information described above from another device through a communication, or may acquire the information described above from a portable storage medium storing the information. Yet further, the data acquiring unit 41 may acquire the child block searching time (d) and the leaf block scanning time (s) calculated through a method similar to that in the first exemplary embodiment, and the entry inserting time (i) as the first child block searching time (d), the first leaf block scanning time (s), and the first entry inserting time (i).

The additional time calculation unit 43 calculates an additional time related to the cache miss through a method similar to that in the third exemplary embodiment.

The individual time calculation unit 42 adds the additional time calculated by the additional time calculation unit 43 to the first child block searching time (d), the first leaf block scanning time (s), and the first entry inserting time (i) to calculate a second child block searching time (d'), a second leaf block scanning time (s'), and a second entry inserting time (i'). The calculation made by the individual time calculation unit 42 is similar to Equation 9 and Equation 10 in the third exemplary embodiment.

The processing time estimation unit 44 uses the second child block searching time (d'), the second leaf block scanning time (s') and the second entry inserting time (i') calculated by the individual time calculation unit 42, and the information acquired by the data acquiring unit 41 to calculate the average processing time (t) per one manipulation performed to the index block. More specifically, the processing time estimation unit 44 uses Equation 13 below to calculate the average processing time (t).

$$t = h*d' + (1-w)*s' + w*i'$$ Equation 13

The first term (h*d') in Equation 13 above indicates the average time required for identifying the target leaf block per one manipulation performed to the index block. The second term ((1-w)*s') indicates the average time required for searching for the target entry in the identified leaf block per one manipulation performed to the index block. The third term (w*i') indicates the average time required for inserting the target index in the identified leaf block per one manipulation performed to the index block.

Figure 8:
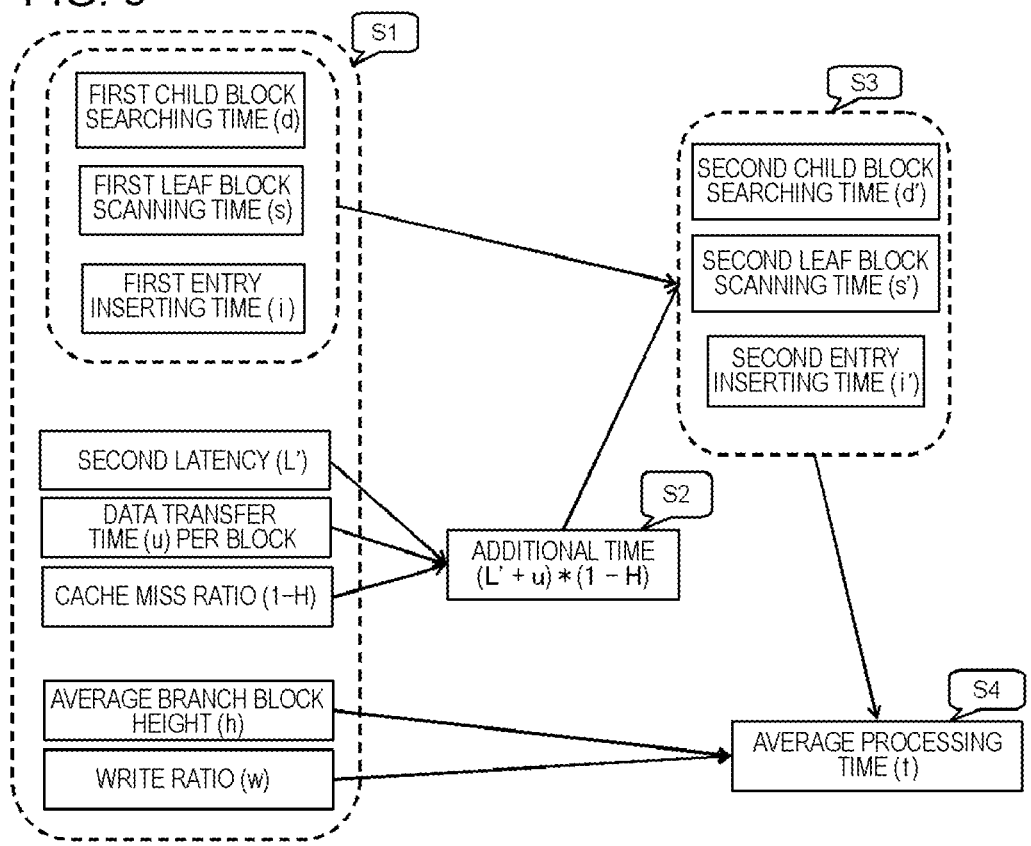
FIG. 8 is a diagram illustrating a flow of data and an example of an operation performed by the database performance estimation device according to the fourth exemplary embodiment.

FIG. 8 is a diagram illustrating a flow of data and an example of an operation performed by the estimation device 10 according to the fourth exemplary embodiment. In the estimation device 10, the data acquiring unit 41 first acquires the second latency (L') concerning the second storage medium, the data transfer time (u) per block, the cache miss ratio (1−H), the average branch block height (h), and the write ratio (w) (S1). The data acquiring unit 41 further acquires the first child block searching time (d), the first leaf block scanning time (s) and the first entry inserting time (i) (S1).

Then, the additional time calculation unit 43 calculates the additional time in a similar manner to the third exemplary embodiment (S2).

Then, the individual time calculation unit 42 adds the additional time to the first child block searching time (d), the first leaf block scanning time (s) and the first entry inserting time (i) acquired by the data acquiring unit 11 to calculate the second child block searching time (d'), the second leaf block scanning time (s'), and the second entry inserting time (i') (S3).

Finally, the processing time estimation unit 44 uses the second child block searching time (d'), the second leaf block scanning time (s'), and the second entry inserting time (i') calculated by the individual time calculation unit 42, and the average branch block height (h) and the write ratio (w) acquired by the data acquiring unit 41 to calculate the average processing time (t) (S4).

[Operation and Effect of Fourth Exemplary Embodiment]

As described above, in the fourth exemplary embodiment, the processing time specifically occurring at the time of cache miss is calculated as the additional time (u), and the times required for various processes (second child block searching time (d'), second leaf block scanning time (s'), second entry inserting time (i')) are calculated in a manner that all these times include the additional time. Further, in the fourth exemplary embodiment, the first child block searching time (d), the first leaf block scanning time (s), and the first entry inserting time (i), which are used to calculate the times required for these various processes, are acquired through the method in the first exemplary embodiment as well as various methods.

According to the fourth exemplary embodiment, the final average processing time (t) can be calculated in a manner that the details of each of the processes at the time of cache hit and cache miss are reflected. Thus, it is possible to highly accurately estimate the time required for manipulation performed to the database.

[Fifth Exemplary Embodiment]

Below, an estimation device 10 according to a fifth exemplary embodiment will be described with focus being placed on things different from the fourth exemplary embodiment. In addition to the configuration of the fourth exemplary embodiment, the fifth exemplary embodiment further includes a configuration of calculating the time required for performing the block division process at the time of inserting an entry. Note that, in the following description, explanation of the details same as the other exemplary embodiments will not be repeated.

[Device Configuration]

The estimation device 10 according to the fifth exemplary embodiment has a configuration similar to that of the fourth exemplary embodiment (see FIG. 7).

The data acquiring unit 41 further acquires the number (j) of block divisions per one manipulation performed to the index block and the first division process unit time (c) indicating the average time required for performing one block division process. These pieces of information are also acquired through various methods in a manner similar to the fourth exemplary embodiment. The first division process unit time (c) may be calculated through a manner similar to the second exemplary embodiment (see Equation 6 and Equation 7 above).

In addition to the process performed in the fourth exemplary embodiment, the individual time calculation unit 42 further calculates the second division process unit time (c'). The second division process unit time (c') is calculated by adding the additional time to the first division process unit time (c).

In addition to the process performed in the fourth exemplary embodiment, the processing time estimation unit 44 further calculates the average time required for performing the block division process per one manipulation to the index block. This average time is calculated by multiplying the second division process unit time (c') calculated by the individual time calculation unit 42 by the number (j) of block divisions per one manipulation performed to the index block. The processing time estimation unit 44 further adds the average time required for performing the block division process to the total of the other average times to estimate the average processing time per one manipulation performed to the index block. More specifically, the processing time estimation unit 44 uses Equation 12 above to calculate the average processing time (t).

[Example of Operation]

Figure 9:
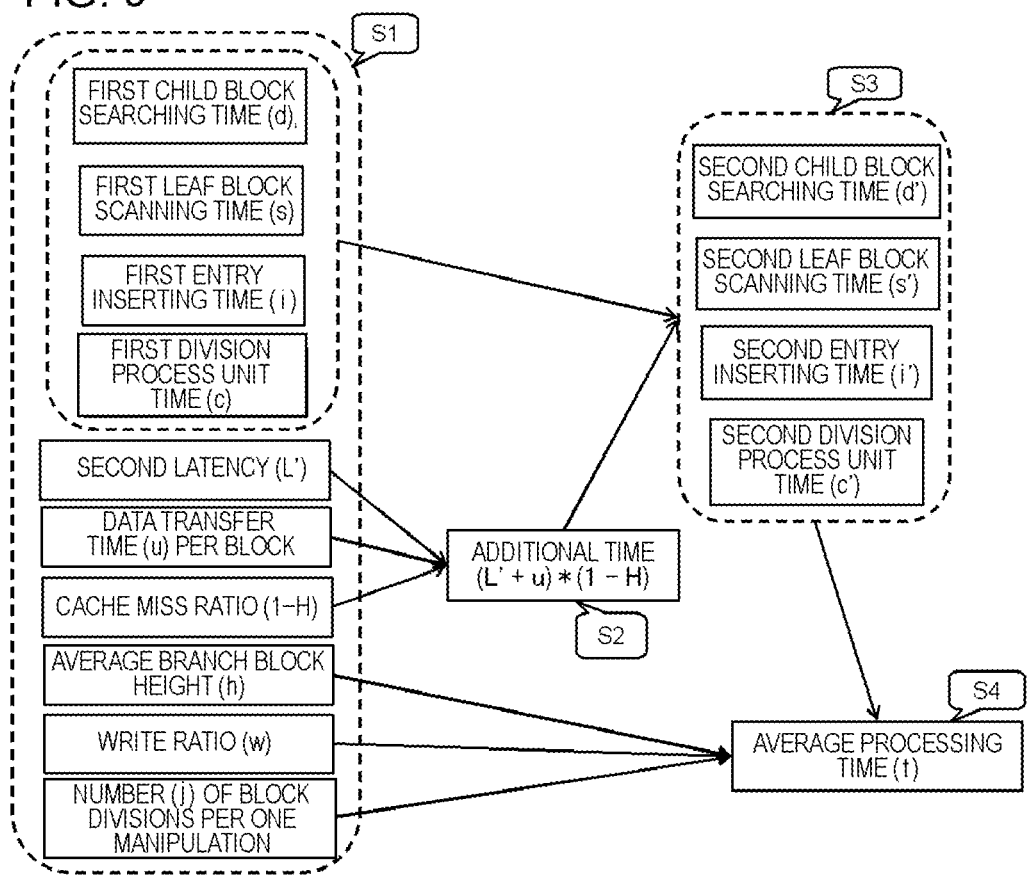
FIG. 9 is a diagram illustrating a flow of data and an example of an operation performed by a database performance estimation device according to a fifth exemplary embodiment.

FIG. 9 is a diagram illustrating a flow of data and an example of an operation performed by the estimation device 10 according to the fifth exemplary embodiment. In the fifth exemplary embodiment, in addition to the information described in the fourth exemplary embodiment, the data acquiring unit 41 further acquires the first division process unit time (c) and the number (j) of block divisions per one manipulation (S1).

After the additional time is calculated by the additional time calculation unit 43 (S2), the additional time calculation unit 43 adds the additional time to the first division process unit time (c) in addition to the calculation process in the fourth exemplary embodiment, whereby the second division process unit time (c') is further calculated (S3).

In addition to the information used in the fourth exemplary embodiment, the processing time estimation unit 44 further uses the second division process unit time (c') and the number (j) of block divisions per one manipulation to calculate the average processing time (t) (S4).

[Operation and Effect of Fifth Exemplary Embodiment]

As described above, in the fifth exemplary embodiment, the average time required for performing one block division process is calculated in a manner that the additional time is included, and according to this calculation result, the average time required for performing the block division process per one manipulation performed to the index block is calculated. In the fifth exemplary embodiment, in addition to the configuration of the fourth exemplary embodiment, this calculation result is used to calculate the average processing time (t) per one manipulation performed to the index block.

Thus, according to the fifth exemplary embodiment, the final average processing time (t) can be calculated with the block division process being reflected in addition to the physical arrangement of data, whereby it is possible to estimate the time required for manipulation performed to the database in a highly accurate manner.

[Modification Example]

In each of the exemplary embodiments described above, the data acquiring units 11 and 41 acquire the write ratio (w). However, it may be possible to acquire a searching ratio (r) for all the manipulations, and use the searching ratio (r) to calculate the write ratio (w) (1−r). Further, it may be possible to acquire the write ratio (w) and the searching ratio (r), and use the acquired searching ratio (r) as (1−w) in Equation 5, Equation 8, Equation 12, and Equation 13 described above.

Further, in each of the exemplary embodiments described above, the data acquiring units 11 and 41 may acquire a block size (b) indicating the average size per block, an entry size (e) indicating the size per entry, and a bandwidth (B) indicating a data transfer rate from the storage medium. In this case, the data acquiring units 11 and 41 may divide the acquired block size (b) by the entry size (e) to calculate the maximum number (k) of entries in each of the blocks, and divide the entry size (e) by the bandwidth (B) to calculate the entry processing time (a). In this case, the entry processing time (a) is calculated as a transfer time for one piece of entry data. This is based on an assumption that the time required for transferring data accounts for larger portion in the entry process than the time required for manipulating the data.

Further, in each of the exemplary embodiments described above, the data acquiring units 11 and 41 may further acquire the total entry number (n) in the index block, and use this total entry number (n) and the average number (m) of entries per block to calculate Equation 14 below, thereby calculating the average branch block height (h).

[Formula 2]

$$h = \log_m \frac{n}{m} \qquad \text{Equation 14}$$

Further, in each of the exemplary embodiments described above, the data acquiring units 11 and 41 may calculate the number (j) of block divisions per manipulation performed to the index block through Equation 15 below using the total entry number (n) in the index block, the average number (m) of entries per block, and the write ratio (w).

$$j=\{(n-m)/(m-1)\}*(w/n) \qquad \text{Equation 15}$$

Equation 15 can be obtained in the following manner. If j' is the number of all the block divisions of the target index block, the number j' of all the block divisions can be expressed as the following equation on the basis of the number of entries in the block and the height of the branch block. The following equation reflects the following idea. More specifically, the total number n of entries is equal to $m^{h+1}$, the number of all the blocks is $(1+m+m^2+ \ldots +m^h)$, and the number j' of all the block divisions is one less than the number of blocks.

$$j' + 1 = 1 + m + m^2 + \ldots + m^h = \frac{1 - m^{h+1}}{1 - m} = \frac{1 - n}{1 - m} \qquad \text{[Formula 3]}$$

$$j' = \frac{n - m}{m - 1}$$

The number (j) of block divisions per one manipulation can be obtained by dividing the number j' of all the block divisions by the number of processes. The number of processes is a value obtained by dividing the total number (n) of entries by the write ratio (w). As described above, Equation 15 above can be obtained.

On the assumption that, in the exemplary embodiments described above, the second storage medium is a hard disk, it should be noted that it may be possible that the second latency (L') is obtained by adding up the average seek time and the average rotational delay time.

Part or all of the exemplary embodiments and the modification examples can be described in a manner illustrated in the Supplementary Notes below. However, the exemplary embodiments and the modification example are not limited to the descriptions below.

(Supplemental Note 1)

A database performance estimation device for a database containing a tree-structured index block, including:

a data acquiring unit that, for the index block, acquires configuration mode data indicating any one of at least two configuration modes, an average number (m) of entries per block, an entry processing time (a) indicating an average processing time per entry, a write ratio (w) indicating a ratio of an insert manipulation relative to all the manipulations, a latency (L) concerning a storage medium storing the index block, and an average branch block height (h);

a searching time calculation unit that has at least two types of calculation methods using the latency (L), the entry processing time (a), and the average number (m) of entries per block and supporting at least two searching methods related to the at least two configuration modes, and acquires, as a child block searching time (d) and a leaf block scanning time (s), an average time required for identifying a target entry in a block, the average time being calculated by switching the at least two types of calculation methods according to the configuration mode data acquired by the data acquiring unit, and performing the switched calculation method;

an inserting time calculation unit that has at least two types of calculation methods supporting at least two entry inserting methods related to the at least two configuration modes, and including a calculation method using the latency (L) and the entry processing time (a) and a calculation method using the latency (L), the entry processing time (a), and the average number (m) of entries per block, and acquires an entry inserting time (i) indicating an average time required for inserting a target entry in a leaf block by switching the at least two types of calculation methods according to the configuration mode data acquired by the data acquiring unit and performing the switched calculation method; and a processing time estimation unit that calculates an average time required for identifying a target leaf block per one manipulation performed to the index block by multiplying the average branch block height (h) by the child block searching time (d), calculates an average time required for searching for a target entry in the identified leaf block per one manipulation performed to the index block using the leaf block scanning time (s) and the write ratio (w), and calculates an average time required for inserting a target entry in the identified leaf block per one manipulation performed to the index block using the entry inserting time (i) and the write ratio (w), thereby estimating a total of the average times calculated as an average processing time per one manipulation performed to the index block.

(Supplemental Note 2)

The database performance estimation device according to Supplemental Note 1, in which the at least two types of calculation methods of the searching time calculation unit include:

a method of adding, to the latency (L), a value obtained by multiplying the entry processing time (a) by the average number (m) of entries per block; and a method of multiplying a value obtained by adding up the latency (L) and the entry processing time (a) by an average number of comparison obtained through binary search applied to the average number (m) of entries per block, and the at least two types of calculation methods of the inserting time calculation unit include:

a method of adding up the latency (L) and the entry processing time (a); and a method of adding a value obtained by multiplying the entry processing time (a) by the average number (m) of entries per block, to the average time required for identifying the target entry in the block calculated by the searching time calculation unit.

(Supplemental Note 3)

The database performance estimation device according to Supplemental Note 1 or 2, in which the data acquiring unit further acquires the maximum number (k) of entries in each block and the number (j) of block divisions per one manipulation performed to the index block, and multiplies the maximum number (k) of entries in each block by a predetermined usage ratio per block, thereby acquiring the average number (m) of entries per block, the database performance estimation device further includes a dividing time calculation unit that has at least two types of calculation methods using the latency (L), the entry processing time (a), and the maximum number (k) of entries in each block and each supporting at least two block division methods related to the at least two configuration modes, and switches the at least two types of calculation methods according to the configuration mode data acquired by the data acquiring unit to perform the calculation method, thereby acquiring a division process unit time (c) indicating an average time required for performing one block division process, and the processing time estimation unit further calculates an average time required for performing the block division process per one manipulation performed to the index block by multiplying the division process unit time (c) by the number (j) of block divisions per one manipulation performed to the index block, and estimates the average processing time per one manipulation performed to the index block by further adding the calculated average time to the total of the other average times.

(Supplemental Note 4)

The database performance estimation device according to Supplemental Note 3, in which the at least two types of calculation methods of the dividing time calculation unit include calculations of following two equations using the latency (L), the entry processing time (a), and the maximum number (k) of entries in each block.

$$c=(L+1.5*a)*k$$

$$c=a*k+2*L$$

(Supplemental Note 5)

The database performance estimation device according to Supplemental Note 3 or 4, in which the data acquiring unit further acquires a first latency concerning a first storage medium, a second latency concerning a second storage medium, a cache miss ratio indicating a probability that a target portion of the index block is not stored in the first storage medium and needs to be transferred from the second storage medium, and a data transfer time per block from the second storage medium to the first storage medium, the database performance estimation device further includes an additional time calculation unit that multiplies the cache miss ratio by a value obtained by adding the second latency to the data transfer time per block from the second storage medium to the first storage medium, thereby calculating an additional time related to a cache miss, the searching time calculation unit includes the additional time in the child block searching time (d) and the leaf block scanning time (s), the inserting time calculation unit includes the additional time in the entry inserting time (i), and the dividing time calculation unit includes the additional time in the division process unit time (c).

(Supplemental Note 6)

A database performance estimation device for a database containing a tree-structured index block, including:

a first data acquiring unit that, for the index block, acquires a write ratio (w) indicating a ratio of an insert manipulation relative to all the manipulations and an average branch block height (h), and acquires a second latency concerning a second storage medium, a cache miss ratio indicating a probability that a target portion of the index block is not stored in a first storage medium, and needs to be transferred from a second storage medium, and a data transfer time per block from the second storage medium to the first storage medium;

a second data acquiring unit that acquires a first child block searching time (d) indicating an average time required for identifying a child block from a block stored in the first storage medium, a first leaf block scanning time (s) indicating an average time required for identifying a target entry in a leaf block stored in the first storage medium, and a first entry inserting time (i) indicating an average time required for inserting a target entry in a leaf block stored in the first storage medium;

an additional time calculation unit that calculates an additional time related to a cache miss by multiplying the cache miss ratio by a value obtained by adding, to the second latency, the data transfer time per block from the second storage medium to the first storage medium;

an individual time calculation unit that calculates a second child block searching time (d'), a second leaf block scanning time (s'), and a second entry inserting time (i') by adding the additional time to the first child block searching time (d), the first leaf block scanning time (s), and the first entry inserting time (i); and a processing time estimation unit that calculates an average time required for identifying a target leaf block per one manipulation performed to the index block by multiplying the second child block searching time (d') by the average branch block height (h), calculates an average time required for searching for a target entry in the identified leaf block per one manipulation performed to the index block using the second leaf block scanning time (s') and the write ratio (w), and calculates an average time required for inserting a target entry in the identified leaf block per one manipulation performed to the index block using the second entry inserting time (i') and the write ratio (w), thereby estimating a total of the average times calculated as an average processing time per one manipulation performed to the index block.

(Supplemental Note 7)

The database performance estimation device according to Supplemental Note 6, in which the first data acquiring unit further acquires the number (j) of block divisions per one manipulation performed to the index block;

the second data acquiring unit further acquires a first division process unit time (c) indicating an average time required for performing one block division process;

the individual time calculation unit calculates a second division process unit time (c') by adding the additional time to the first division process unit time (c); and the processing time estimation unit further calculates an average time required for performing the block division process per one manipulation performed to the index block by multiplying the second division process unit time (c') by the number (j) of block divisions per one manipulation performed to the index block, and estimates the average processing time per one manipulation performed to the index block by further adding this average time to the total of the other average times.

(Supplemental Note 8)

The database performance estimation device according to any one of Supplemental Notes 3 to 5, and 7, in which the data acquiring unit further acquires the total entry number (n) in the index block and includes a dividing number calculation unit that acquires the number (j) of block divisions per one manipulation performed to the index block through an equation below using the total entry number (n), the average number (m) of entries per block, and the write ratio (w).

$$j=\{(n-m)/(m-1)\}*(w/n)$$

(Supplemental Note 9)

The database performance estimation device according to any one of Supplemental Notes 3 to 5, and 7 to 8, in which the data acquiring unit further acquires a block size (b) indicating an average size per block, an entry size (e) indicating a size per entry, and a bandwidth (B) indicating a data transfer rate from the storage medium, divides the block size (b) by the entry size (e) to acquire the maximum number (k) of entries in the block, and divides the entry size (e) by the bandwidth (B) to acquire the entry processing time (a).

(Supplemental Note 10)

The database performance estimation device according to any one of Supplemental Notes 1 to 9, in which the data acquiring unit further acquires the total number (n) of entries in the index block, and calculates an equation below using the average number (m) of entries per block and the total number (n) of entries, thereby acquiring the average branch block height (h).

$$h=\log_m n/m$$

(Supplemental Note 11)

A database performance estimation method for a database containing a tree-structured index block, in which a computer:

acquires, in connection with the index block, configuration mode data indicating any one of at least two configuration modes, an average number (m) of entries per block, an entry processing time (a) indicating an average processing time per entry, a write ratio (w) indicating a ratio of an insert manipulation relative to all the manipulations, a latency (L) concerning a storage medium storing the index block, and an average branch block height (h);

acquires an average time required for identifying a target entry in a block as a child block searching time (d) and a leaf block scanning time (s), the average time being calculated by switching, according to the configuration mode data, at least two types of calculation methods using the latency (L), the entry processing time (a), and the average number (m) of entries per block and supporting at least two searching methods related to the at least two configuration modes, and performing the switched calculation method;

acquires an entry inserting time (i) indicating an average time required for inserting a target entry in a leaf block by switching, according to the configuration mode data, at least two types of calculation methods supporting at least two entry inserting methods related to the at least two configuration modes, and including a calculation method using the latency (L) and the entry processing time (a) and a calculation method using the latency (L), the entry processing time (a), and the average number (m) of entries per block, calculates an average time required for identifying a target leaf block per one manipulation performed to the index block by multiplying the average branch block height (h) by the child block searching time (d);

calculates an average time required for searching for a target entry in the identified leaf block per one manipulation performed to the index block using the leaf block scanning time (s) and the write ratio (w);

calculates an average time required for inserting a target entry in the identified leaf block per one manipulation performed to the index block using the entry inserting time (i) and the write ratio (w); and estimates a total of the average times calculated as an average processing time per one manipulation performed to the index block.

(Supplemental Note 12)

The database performance estimation method according to Supplemental Note 11, in which the at least two types of calculation methods supporting the at least two searching methods include:
- a method of adding, to the latency (L), a value obtained by multiplying the entry processing time (a) by the average number (m) of entries per block; and
- a method of multiplying a value obtained by adding up the latency (L) and the entry processing time (a) by an average number of comparison obtained through binary search applied to the average number (m) of entries per block, and the at least two types of calculation methods supporting the at least two entry inserting methods include:
- a method of adding up the latency (L) and the entry processing time (a); and
- a method of adding a value obtained by multiplying the entry processing time (a) by the average number (m) of entries per block, to the average time required for identifying the target entry in the block.

(Supplemental Note 13)

The database performance estimation method according to Supplemental Note 11 or 12, in which the computer:
further acquires the maximum number (k) of entries in each block and the number (j) of block divisions per one manipulation performed to the index block, and multiplies the maximum number (k) of entries in each block by a predetermined usage ratio per block, thereby acquiring the average number (m) of entries per block;

switches, according to the configuration mode data, at least two types of calculation methods supporting at least two block division methods related to the at least two configuration modes and using the latency (L), the entry processing time(a), and the maximum number (k) of entries in each block and performs the switched calculation method, thereby acquiring a division process unit time (c) indicating an average time required for performing one block division process; and calculates an average time required for performing the block division process per one manipulation performed to the index block by multiplying the division process unit time (c) by the number (j) of block divisions per one manipulation performed to the index block, and the estimation of the average processing time per one manipulation estimates the average processing time per one manipulation performed to the index block by further adding the average time required for performing the block division process per one manipulation performed to the index block to the total of the other average times.

(Supplemental Note 14)

The database performance estimation method according to Supplemental Note 13, in which the at least two types of calculation methods supporting the at least two block division methods include calculations of the following two equations using the latency (L), the entry processing time (a), and the maximum number (k) of entries in each block.

$$c=(L+1.5*a)*k$$

$$c=a*k+2*L$$

(Supplemental Note 15)

The database performance estimation method according to Supplemental Note 13 or 14, in which the computer:
acquires a first latency concerning a first storage medium, a second latency concerning a second storage medium, a cache miss ratio indicating a probability that a target portion of the index block is not stored in the first storage medium and needs to be transferred from the second storage medium, and a data transfer time per block from the second storage medium to the first storage medium, calculates an additional time related to a cache miss by multiplying the cache miss ratio by a value obtained by adding the second latency to the data transfer time per block from the second storage medium to the first storage medium, and includes the additional time in the child block searching time (d), the leaf block scanning time (s), the entry inserting time (i), and the division process unit time (c).

(Supplemental Note 16)

A database performance estimation method for a database containing a tree-structured index block, in which a computer:

acquires, in connection with the index block, a write ratio (w) indicating a ratio of an insert manipulation relative to all the manipulations and an average branch block height (h);

acquires a second latency concerning a second storage medium, a cache miss ratio indicating a probability that a target portion of the index block is not stored in a first storage medium, and needs to be transferred from a second storage medium, and a data transfer time per block from the second storage medium to the first storage medium;

acquires a first child block searching time (d) indicating an average time required for identifying a child block from a block stored in the first storage medium, a first leaf block scanning time (s) indicating an average time required for identifying a target entry in a leaf block stored in the first storage medium, and a first entry inserting time (i) indicating an average time required for inserting a target entry in the leaf block stored in the first storage medium;

calculates an additional time related to a cache miss by multiplying the cache miss ratio by a value obtained by adding, to the second latency, the data transfer time per block from the second storage medium to the first storage medium;

calculates a second child block searching time (d'), a second leaf block scanning time (s'), and a second entry inserting time (i') by adding the additional time to the first child block searching time (d), the first leaf block scanning time (s), and the first entry inserting time (i);

calculates an average time required for identifying a target leaf block per one manipulation performed to the index block by multiplying the second child block searching time (d') by the average branch block height (h);

calculates an average time required for searching for a target entry in the identified leaf block per one manipulation performed to the index block using the second leaf block scanning time (s') and the write ratio (w);

calculates an average time required for inserting a target entry in the identified leaf block per one manipulation performed to the index block using the second entry inserting time (i') and the write ratio (w); and estimates a total of the average times calculated as an average processing time per one manipulation performed to the index block.

(Supplemental Note 17)

The database performance estimation method according to Supplemental Note 16, in which the computer:

acquires the number (j) of block divisions per one manipulation performed to the index block;

acquires a first division process unit time (c) indicating an average time required for performing one block division process;

calculates a second division process unit time (c') by adding the additional time to the first division process unit time (c); and calculates an average time required for performing the block division process per one manipulation performed to the index block by multiplying the second division process unit time (c') by the number (j) of block divisions per one manipulation performed to the index block, and the estimation of the average processing time per one manipulation estimates the average processing time per one manipulation performed to the index block by further adding the average time required for performing the block division process per one manipulation performed to the index block to the total of the other average times.

(Supplemental Note 18)

The database performance estimation method according to any one of Supplemental Notes 13 to 15, and 17, in which the computer:

acquires the total entry number (n) in the index block; and acquires the number (j) of block divisions per one manipulation performed to the index block through an equation below using the total entry number (n), the average number (m) of entries per block, and the write ratio (w).

$$j=\{(n-m)/(m-1)\}*(w/n)$$

(Supplemental Note 19)

The database performance estimation method according to any one of Supplemental Notes 13 to 15, and 17 to 18, in which the computer:

acquires a block size (b) indicating an average size per block, an entry size (e) indicating a size per entry, and a bandwidth (B) indicating a data transfer rate from the storage medium;

divides the block size (b) by the entry size (e) to calculate the maximum number (k) of entries in the block; and divides the entry size (e) by the bandwidth (B) to calculate the entry processing time (a).

(Supplemental Note 20)

The database performance estimation method according to any one of Supplemental Notes 11 to 19, in which the computer:

acquires the total number (n) of entries in the index block; and calculates an equation below using the average number (m) of entries per block and the total number (n) of entries, thereby calculating the average branch block height (h).

$$h=\log_m n/m$$

The present application claims priority based on Japanese Patent Application No. 2011-127930 filed on Jun. 8, 2011, the disclosures of which are incorporated herein by reference in their entirety.

The invention claimed is:

1. A database performance estimation device for a database containing a tree-structured index block, comprising:

a processor; and an interface coupled to the processor;

wherein the processor is configured to:

acquires configuration mode data for the index block from the interface, the data indicating any one of at least two configuration modes, and average number (m) of entries per block, an entry processing rime (a) indicating an average processing time per entry, a write ratio (w) indicating a ratio of an insert manipulation relative to all the manipulations of the tree-structured index block, a latency (L) concerning a storage medium storing the index block, and an average branch block height (h);

calculate a searching time via at least two types of searching time calculation methods using the latency (L), the entry processing time (a), and the average number (m) of entries per block, wherein at least two searching methods related to the at least two configuration modes are supported;

acquires, as a child block searching time (d) and a leaf block scanning time (s), an average time required for identifying a target entry in a block, the average time being calculated by switching the at least two types of searching time calculation methods according to the configuration mode data;

calculate an entry insert (i) time via at least two types of inserting time calculation methods, wherein at least two entry inserting methods related to the at least two configuration modes are supported; wherein the at least two inserting time calculation methods include a calculation method using the latency (L) and the entry processing time (a), and a calculation method using the latency (L), the entry processing time (a), and the average number (m) of entries per block;

acquires an entry inserting time (i) indicating an average time required for inserting a target entry in a leaf block by switching the at least two types of inserting time calculation methods according to the configuration mode data acquired by the data acquiring unit and performing the switched calculation method; and calculates an average time required for identifying a target leaf block per one manipulation performed to the index block by multiplying the average branch block height (h) by the child block searching time (d);

calculate an average time required for searching for a target entry in the identified leaf block per one manipulation performed to the index block using the leaf block scanning time (s) and the write ratio (w), and calculates an average time required for inserting a target entry in the identified leaf block per one manipulation performed to the index block using the entry inserting time (i) and the write ratio (w), thereby estimating a total of the average times calculated as an average processing time per one manipulation performed to the index block.

2. The database performance estimation device according to claim 1, wherein the at least two types of search time calculation methods include:

a method of adding, to the latency (L), a value obtained by multiplying the entry processing time (a) by the average number (m) of entries per block; and a method of multiplying a value obtained by adding up the latency (L) and the entry processing time (a) by an average number of comparison obtained through binary search applied to the average number (m) of entries per block, and the at least two types of inserting time calculation methods include:

a method of adding up the latency (L) and the entry processing time (a); and a method of adding a value obtained by multiplying the entry processing time (a) by the average number (m) of entries per block, to the average time required for identifying the target entry in the block.

3. The database performance estimation device according to claim 1, wherein the processor is further configured to:

acquire a maximum number (k) of entries in each block and a number (j) of block divisions per one manipulation performed to the index block, and multiply the maximum number (k) of entries in each block by a predetermined usage ratio per block, thereby acquiring an average number (m) of entries per block, calculate a dividing time via at least two types of dividing time calculation methods using the latency (L), the entry processing time (a), and the maximum number (k) of entries in each block and each supporting at least two block division methods related to the at least two configuration modes, and switch the at least two types of dividing time calculation methods according to the configuration mode data to perform the switched calculation method, thereby acquiring a division process unit time (c) indicating an average time required for performing one block division process, and calculate an average time required for performing the block division process per one manipulation performed to the index block by multiplying the division process unit time (c) by the number (j) of block divisions per one manipulation performed to the index block, and estimate the average processing time per one manipulation performed to the index block by further adding the calculated average time to the total of the other average times.

4. The database performance estimation device according to claim 3, wherein the at least two types of dividing time calculation methods include calculations of following two equations using the latency (L), the entry processing time (a), and the maximum number (k) of entries in each block $c=(L+1.5*a)*k$; and $c=a*k+2*L$.

5. The database performance estimation device according to claim 3, wherein the processor is further configured to:

acquire a first latency concerning a first storage medium, a second latency concerning a second storage medium, a cache miss ratio indicating a probability that a target portion of the index block is not stored in the first storage medium and needs to be transferred from the second storage medium, and a data transfer time per block from the second storage medium to the first storage medium, multiply the cache miss ratio by a value obtained by adding the second latency to the data transfer time per block from the second storage medium to the first storage medium, thereby calculating an additional time related to a cache miss, the searching time calculation includes the additional time in the child block searching time (d) and the leaf block scanning time (s), the inserting time calculation includes the additional time in the entry inserting time (i), and the dividing time calculation includes the additional time in the division process unit time (c).

6. The database performance estimation device according to claim 3, wherein the processor is further configured to:

acquire the total entry number (n) in the index block and includes a dividing number calculation unit that acquires the number (j) of block divisions per one manipulation performed to the index block through an equation below using the total entry number (n), the average number (m) of entries per block, and the write ratio (w), $j=\{(n-m)/(m-1)\}*(w/n)$.

7. A database performance estimation device for a database containing a tree-structured index block, including:

a processor; and an interface coupled to the processor;

wherein the processor is configured to:

acquire a write ratio (w) indicating a ratio of an insert manipulation relative to all the manipulations of the tree-structured index block and an average branch block height (h);

acquire a second latency concerning a second storage medium, a cache miss ratio indicating a probability that a target portion of the index block is not stored in a first storage medium, and needs to be transferred from the second storage medium, and a data transfer time per block from the second storage medium to the first storage medium;

acquire a first child block searching time (d) indicating an average time required for identifying a child block from a block stored in the first storage medium, a first leaf block scanning time (s) indicating an average time required for identifying a target entry in a leaf block stored in the first storage medium, and a first entry inserting time (i) indicating an average time required for inserting a target entry in a leaf block stored in the first storage medium;

calculate an additional time related to a cache miss by multiplying the cache miss ratio by a value obtained by adding, to the second latency, the data transfer time per block from the second storage medium to the first storage medium;

calculate a second child block searching time (d'), a second leaf block scanning time (s'), and a second entry inserting time (i') by adding the additional time to the first child block searching time (d), the first leaf block scanning time (s), and the first entry inserting time (i);

calculate an average time required for identifying a target leaf block per one manipulation performed to the index block by multiplying the second child block searching time (d') by the average branch block height (h);

calculate an average time required for searching for a target entry in the identified leaf block per one manipulation performed to the index block using the second leaf block scanning time (s') and the write ratio (w); and calculate an average time required for inserting a target entry in the identified leaf block per one manipulation performed to the index block using the second entry inserting time (i') and the write ratio (w), thereby estimating a total of the average times calculated as an average processing time per one manipulation performed to the index block.

8. The database performance estimation device according to claim 7, wherein the processor is further configured to:
acquire a number (j) of block divisions per one manipulation performed to the index block;
acquire a first division process unit time (c) indicating an average time required for performing one block division process;
calculate a second division process unit time (c') by adding the additional time to the first division process unit time (c);
calculate an average time required for performing the block division process per one manipulation performed to the index block by multiplying the second division process unit time (c') by the number (j) of block divisions per one manipulation performed to the index block; and
estimate the average processing time per one manipulation performed to the index block by further adding the average time to the total of the other average times.

9. The database performance estimation device according to claim 8, wherein the processor is further configured to:
acquire the total entry number (n) in the index block;
acquire the number (j) of block divisions per one manipulation performed to the index block through an equation below using the total entry number (n), the average number (m) of entries per block, and the write ratio (w)

$j=\{(n-m)/(m-1)\}*(w/n)$.

10. A database performance estimation method for a database containing a tree-structured index block, the database performance estimation method executed by processor having an interface coupled to the processor, the method comprising:
acquiring, in connection with the index block, configuration mode data indicating any one of at least two configurations modes, and average number (m) of entries per block, and entry processing time (a) indicating an average processing time per entry, a write ratio (w) indicating a ratio of an insert manipulation relative to all the manipulations of the tree-structured index block, a latency (L) concerning a storage medium storing the index block, and an average branch block height (h);
acquiring an average time required for identifying a target entry in a block as a child block searching time (d) and a leaf block scanning time (s), the average time being calculated by switching, according to the configuration mode data, at least two types of calculation methods using the latency (L), the entry processing time (a), and the average number (m) of the entries per block and supporting at least two searching methods related to the at least two configuration modes, and performing the switched calculation method;
acquiring an entry inserting time (i) indicating an average time required for inserting a target entry in a leaf block by switching, according to the configuration mode data, at least two types of calculation methods supporting at least two entry inserting methods related to the at least two configuration modes, and including a calculation method using the latency (L) and the entry processing time (a) and a calculation method using the latency (L), the entry processing time (a), and the average number (m) of entries per block, and performing the switched calculation method,
calculating an average time required for identifying a target leaf block per one manipulation performed to the index block by multiplying the average branch block height (h) by the child block searching time (d);
calculating an average time required for searching for a target entry in the identified leaf block per one manipulation performed to the index block using the leaf block scanning time (s) and the write ratio (w);
calculating an average time required for inserting a target entry in the identified leaf block per one manipulation performed to the index block using the entry inserting time (i) and the write ratio (w); and
estimating a total of the average times calculated as an average processing time per one manipulation performed to the index block.

11. A database performance estimation method for a database containing a tree-structured index block, the database performance estimation method executed by a processor having an interface coupled to the processor, the method, comprising:
acquiring, in connection with the index block, a write ratio (w) indicating a ratio of an insert manipulation relative to all the manipulations of the tree-structured index block and an average branch block height (h);
acquiring a second latency concerning a second storage medium, a cache miss ratio indicating a probability that a target portion of the index block is not stored in a first storage medium, and needs to be transferred from a second storage medium, and a data transfer time per block from the second storage medium to the first storage medium;
acquiring a first child block searching time (d) indicating an average time required for identifying a child block from a block stored in the first storage medium, a first leaf block scanning time (s) indicating an average time required for identifying a target entry in a leaf block stored in the first storage medium, and a first entry inserting time (i) indicating an average time required for inserting a target entry in the leaf block stored in the first storage medium;
calculating an additional time related to a cache miss by multiplying the cache miss ratio by a value obtained by adding, to the second latency, the data transfer time per block from the second storage medium to the first storage medium;
calculating a second child block searching time (d'), a second leaf block scanning time (s'), and a second entry inserting time (i') by adding the additional time to the first child block searching time (d), the first leaf block scanning time (s), and the first entry inserting time (i);
calculating an average time required for identifying a target leaf block per one manipulation performed to the index block by multiplying the second child block searching time (d') by the average branch block height (h);
calculating an average time required for searching for a target entry in the identified leaf block per one manipulation performed to the index block using the second leaf block scanning time (s') and the write ratio (w);
calculating an average time required for inserting a target entry in the identified leaf block per one manipulation performed to the index block using the second entry inserting time (i') and the write ratio (w); and
estimating a total of the average times calculated as an average processing time per one manipulation performed to the index block.

* * * * *